United States Patent

Kozaki et al.

[11] Patent Number: 5,838,677
[45] Date of Patent: Nov. 17, 1998

[54] SWITCHING SYSTEM HAVING MEANS FOR CONGESTION CONTROL BY MONITORING PACKETS IN A SHARED BUFFER AND BY SUPPRESSING THE READING OF PACKETS FROM INPUT BUFFERS

[75] Inventors: Takahiko Kozaki, Tokyo; Masahiro Takatori, Yokohama; Noboru Endo, Kodaira; Akihiko Takase, Tokyo; Yozo Oguri, Fujisawa, all of Japan

[73] Assignee: Hitachi, Ltd., Tokyo, Japan

[21] Appl. No.: 633,306

[22] Filed: Apr. 15, 1996

[30] Foreign Application Priority Data

Apr. 18, 1995 [JP] Japan ................................ 7-092198

[51] Int. Cl.⁶ .................................................. H04Q 11/04
[52] U.S. Cl. ........................ 370/389; 370/230; 370/235; 370/412; 370/428
[58] Field of Search .................................... 370/389, 392, 370/395, 413, 414, 415, 416, 417, 418, 419, 428, 229, 230, 235, 412, 398

[56] References Cited

U.S. PATENT DOCUMENTS 5,189,668  2/1993  Takatoni et al. ...................... 370/398
5,448,564  9/1995  Thor ...................................... 370/392
5,535,197  7/1996  Cotton .................................. 370/395
5,566,170  10/1996  Bakke et al. ........................ 370/392
5,583,861  12/1996  Holden ................................ 370/419
5,629,937  5/1997  Hayter et al. ....................... 370/412

FOREIGN PATENT DOCUMENTS

A-6-197128  12/1992  Japan ............................ H04L 12/56
A-7-107116  10/1993  Japan ............................ H04L 12/56

*Primary Examiner*—Douglas W. Olms
*Assistant Examiner*—Shick Hom
*Attorney, Agent, or Firm*—Antonelli, Terry, Stout & Kraus, LLP

[57] ABSTRACT

In a switching system connected between a plurality of input lines and a plurality of output lines, destinations of a plurality of cells incoming from the plurality of input lines are monitored to detect an output line in a congestion state. Upon detection of the output line in an congestion state, congestion information indicating the output line in the congestion state is generated and added to the output cells. An input buffer control circuit derives the congestion information from the received cell, and performs buffering of a cell or cells in an input buffer, which cells are distributed to the output line in the congested state, among cells input from the input line.

42 Claims, 11 Drawing Sheets

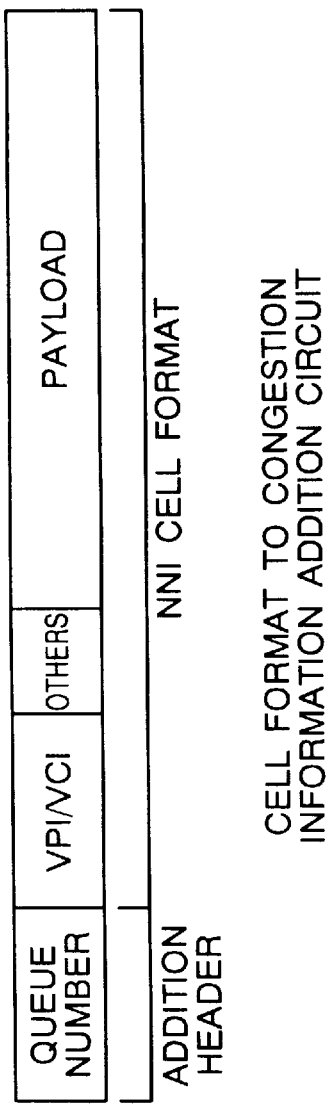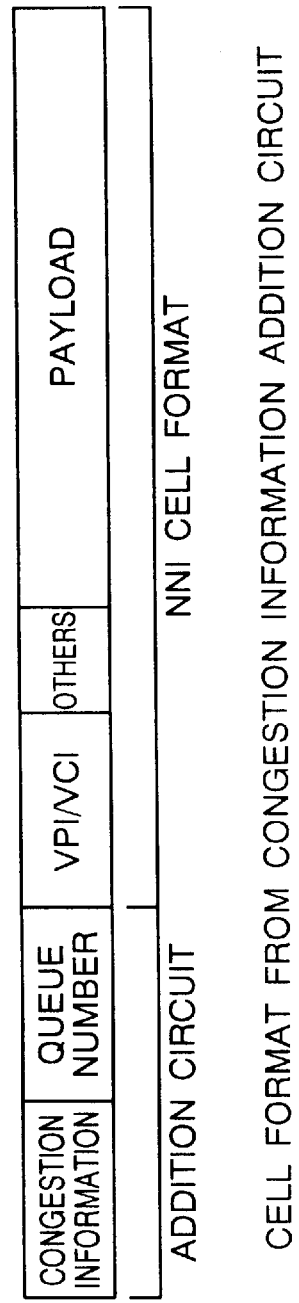
FIG. 3A
FIG. 3B

SWITCHING SYSTEM HAVING MEANS FOR CONGESTION CONTROL BY MONITORING PACKETS IN A SHARED BUFFER AND BY SUPPRESSING THE READING OF PACKETS FROM INPUT BUFFERS

CROSS-REFERENCE TO RELATED APPLICATIONS

This application is related to U.S. applications Ser. No. 07/218,217 filed Jul. 13, 1988 now patented U.S. Pat. No. 4,910,731; Ser. No. 07/482,090 filed Feb. 20, 1990 now patented U.S. Pat. No. 5,124,977; Ser. No. 526,381 filed May 21, 1990 now patented U.S. Pat. No. 5,184,346; Ser. No. 07/564,617 filed Aug. 9, 1990 now patented U.S. Pat. No. 5,099,475; Ser. No. 07/741,588 filed Aug. 7, 1991 now patented U.S. Pat. No. 5,189,668; Ser. No. 07/745,466 filed Aug. 14, 1991 now patented U.S. Pat. No. 5,280,475; and Ser. No. 07/845,668 filed Mar. 4, 1992 now patented U.S. Pat. No. 5,365,519, the contents of which are incorporated herein by reference.

BACKGROUND OF THE INVENTION

The present invention relates to a switching system, and more particularly to an Asynchronous Transfer Mode (ATM) switching system suitable for broad band ISDN networks and capable of lowering a cell discard rate of burst traffic.

An ATM switching system has a switching function by which fixed length packets (hereinafter called a cell) arriving at input lines are routed to particular output lines determined by the header information of respective cells. The ATM switching system does not execute a special control of suppressing a concentration of cells on one output line, such as executing scheduling between input lines. It is therefore necessary to provide a buffer in the switching system for buffering cells concentrated on a particular one output line from a plurality of input lines. If cells in excess of the buffer capacity are concentrated, some of newly arrived cells are discarded. In order to avoid cell discard, the capacity of the buffer is required to be increased.

A switch structure which devises a buffer allocation so as to suppress cell discard is disclosed, for example, in JP-A-6-197128 in which a plurality of output and input buffers are provided at the output and input sides of the switch, corresponding to the output and input lines. If a particular output buffer is judged to be close to a state where cells with overflow, a control signal (back pressure signal) is supplied to the input side before a cell discard occurs to thereby suppress sending a cell from all input buffers to the particular output buffer and perform buffering of cells in the input buffers. With this switch structure, the input buffers compensate for the insufficient capacity of each output buffer.

With this switch structure, however, the input and output buffers are provided for respective input and output lines. Therefore, a cell discard rate becomes high when traffic becomes irregular.

For example, if traffic concentrates on a certain output line, the number of cells on other output lines reduces correspondingly. Therefore, in order to avoid the saturation of the output buffer at the output line on which the traffic was concentrated, all the input buffers are immediately required to perform cell buffering irrespective of the sufficient capacity of the other buffers at the other output lines not concentrated. Furthermore, if traffic is concentrated from a particular input line to a particular output line, only the input buffer for the particular input line can contribute to cell buffering, and the other input buffers for the other input lines cannot help the cell discard suppression operation of the particular input buffer.

A shared output buffer provided for a plurality of input buffers is disclosed in JP-A-7-107116. However, with this disclosed technique, if the shared output buffer is judged to be close to a state where cells will overflow, a back pressure signal is supplied to the input buffers to suppress an output of cells from the input buffers to the shared output buffer. Therefore, this poses a problem that some input buffers execute unnecessary buffering.

SUMMARY OF THE INVENTION

It is an object of the present invention to provide a switching system capable of lowering a cell discard rate even if traffic on the input and output lines becomes irregular.

It is another object of the present invention to provide a switching system capable of efficiently using buffers of the system.

In order to achieve the above objects of the invention, a switching system is provided in a first embodiment. The switching system is connected to a plurality of input lines and a plurality of output lines and includes, a plurality of input buffers provided for each of the input lines; a plurality of input buffer control circuits provided for each of the input buffers, for writing a packet (or cell) arrived at the input line in the input buffer and reading a packet from the input buffer; a switch for temporarily storing packets read from the plurality of input buffers in a shared buffer and thereafter making each packet be destined for one of the output lines determined by header information of each packet; a monitoring circuit for monitoring the storage state of packets in the shared buffer and generating congestion control information indicating the output line on which packets are excessive; and congestion notifying circuit for notifying each of the input buffer control circuit of the congestion control information. Each of the input buffer control circuits selectively reads a packet from the input buffer in accordance with the congestion control information and controls the storage of a packet in the shared buffer.

A second embodiment of the invention provides a switching system in which a plurality of input and output lines are divided into a plurality of groups, a plurality of input output lines of each group are accommodated in a switch via a multiplexer/demultiplexer circuit provided for each group, packets (or cells) inputted from a plurality of relatively low speed input lines are multiplexed and supplied to the switch at a high speed, and packets outputted at a high speed from the switch are destined for respective ones of a plurality of low speed output lines. In the switching system each multiplexer/demultiplexer circuit includes an input buffer for temporarily storing the multiplexed input packet and an input buffer control circuit for writing a packet into the input buffer and reading a packet to the input port from the input buffer. The switch includes a congestion notifying circuit for detecting a storage state on packets in the switch for each of the output lines, generating congestion control information indicating an excessive storage of packets relative to a particular output line, and notifying the input buffer control circuit of the congestion control information. The input buffer control circuit suppresses reading a packet from the input buffer, the packet being destined for the particular output line determined by the congestion control information.

A third embodiment of the invention provides a switching system in which a plurality of input and output lines are divided into a plurality of groups, and a plurality of input output lines of each group are accommodated in a switch via a multiplexer/demultiplexer circuit provided for each group. In this switching system, each multiplexer/demultiplexer circuit includes a multiplexer for multiplexing input packets arrived from a plurality of input lines; an input buffer for temporarily storing a multiplexed input packet an input buffer control circuit for writing a packet into the input buffer and reading a packet from the input buffer; an output buffer for temporarily storing an output packet supplied from each input port; a demultiplexer for making an output packet read from the output buffer be destined for one of a plurality of output lines; and an output buffer control circuit for writing an output packet into the output buffer, reading an output packet to the demultiplexer from the output buffer, and generating congestion control information by detecting a storage state of packets in the output buffer. The congestion control information is notified to the input buffer control circuit of the plurality of demultiplexing circuits by a control information distribution circuit, and each of the input buffer control means suppresses reading a packet from the input buffer, the packet being destined for a particular output line identified by the congestion control information.

With the system structure of the first embodiment, the shared buffer is provided in the switch, input packets are temporarily stored in a plurality of output queues logically formed on the shared buffer in correspondence with each of the output lines, and the number of packets is supervised from the viewpoint of the total capacity of the shared buffer. Accordingly, even if packets are destined for a particular output line in a concentrated manner, packets can be sequentially added to an output queue of the particular output line so long as the shared buffer has an empty area. Therefore, even if traffic is biased to a particular output line, a probability that the shared buffer of the switch becomes full of packets and some packets are discarded, is low.

According to the invention, when the amount of packets in any one of the output queues of the shared buffer exceeds a preset threshold value, this state represented by congestion control information is notified to the buffer control means at each input line to suppress reading a packet destined for the congested output line from each input packet. It is therefore possible to avoid an empty area insufficiency of the shared buffer and packet discard before these states occur, and to further reduce a packet (cell) discard rate.

According to the second embodiment, each input buffer is used as the shared buffer to be used in common for a plurality of input lines of each group. It is therefore possible to allocate a sufficient memory capacity to a queue of an input line among a plurality of input lines, the queue corresponding to a particular output line to which a packet output is suppressed because of congestion control information. Accordingly, the packet output can be suppressed in a relatively long time in response to a request from the switching means, by using this input buffer.

With the system structure of the third embodiment of the invention, an output buffer shared by a plurality of output lines of each group is provided at the front stage of the demultiplexer means for making an output packet be destined for a corresponding one of the output lines, and the amount of packets in the output buffer is adapted to be subjected to a congestion control. Accordingly, the allowable concentration amount of traffic of each output line can be increased further without packet discard.

BRIEF DESCRIPTION OF THE DRAWINGS

FIGS. 3A and 3B show cell formats used by the system of the first embodiment.

DETAILED DESCRIPTION OF THE PREFERRED EMBODIMENTS

Figure 1:
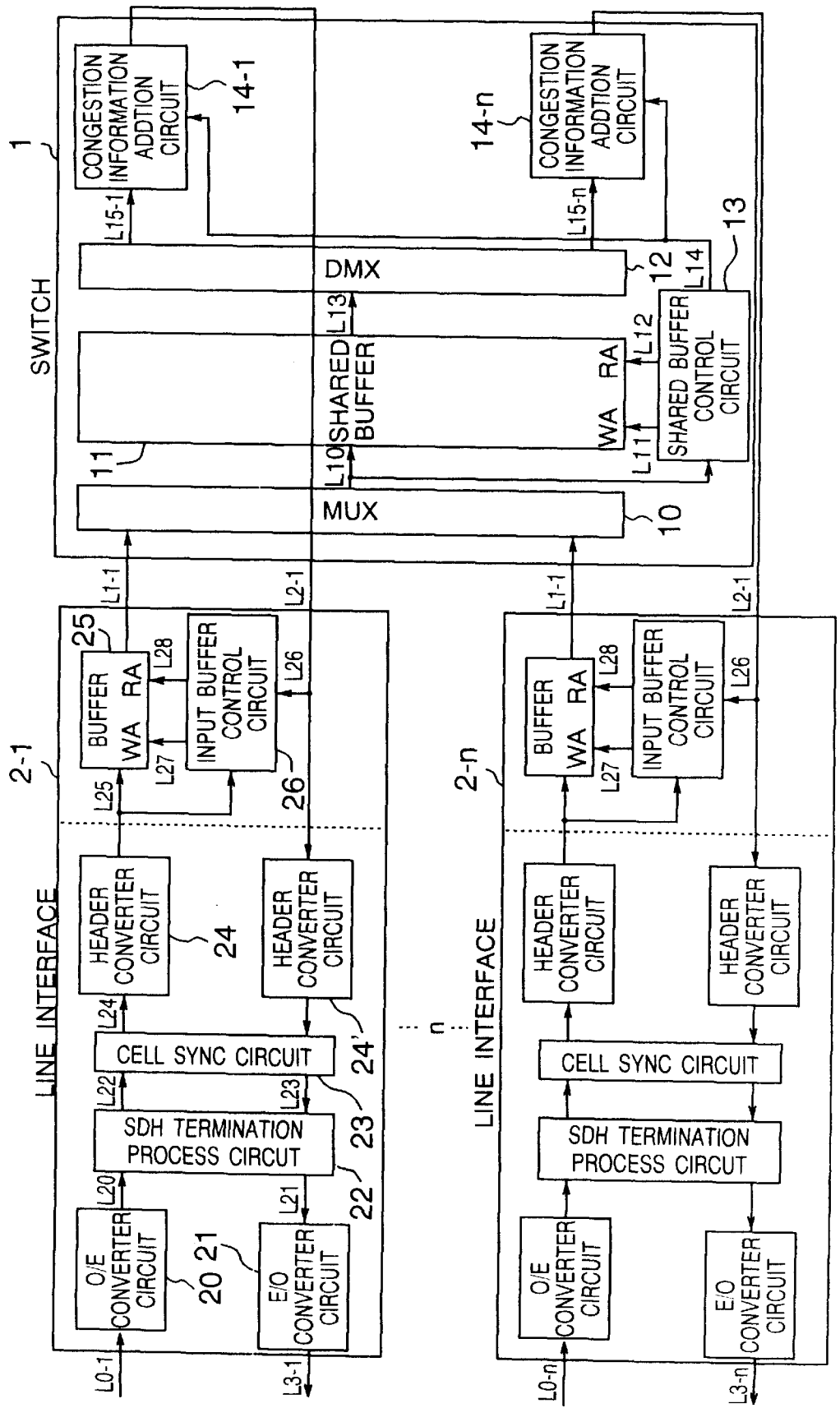
FIG. 1 is a block diagram showing the structure of an ATM switching system according to a first embodiment of the invention.

FIG. 1 is a diagram showing the structure of an ATM switching system according to the first embodiment of the invention.

The ATM switching system is constituted by a switch 1 and n line interfaces 2 (2-1 to 2-n). Although the switch 1 has a call control unit (processor), this unit is not directly relevant to the feature of this invention, and so it is omitted in FIG. 1.

In the line interface 2-1, an input signal (e.g., optical signal) from an input line L0-1 made of an optical fiber is converted into an electrical signal by an Optics/Electronics (O/E) converter circuit 20. An output signal (cell) from the O/E converter circuit 20 is subjected to a Synchronous Digital Hierarchy (SDH) termination process by an SDH termination process circuit 22, and cell synchronization is obtained by a cell sync circuit 23 to change its timing to the clocks of the ATM switching system.

A cell outputted from the cell sync circuit 23 to a line L24 is supplied to a header converter circuit 24 to rewrite header information such as Virtual Path Identifier/Virtual Channel Identifier (VPI/VCI) and to add routing information. The input cell with changed header information is temporarily stored in an input buffer 25 under the control of an input buffer control circuit 26. In accordance with the header information of each input cell, the input buffer control circuit 26 writes a cell in the input buffer 25N, and reads a cell therefrom to transfer it to an input line (input port) L1-1 of the switch 1.

In the switch 1, cells from the lines L1-1 to L1-n are multiplexed by a multiplexer (MUX) circuit 10, and thereafter stored in a shared buffer 11 under the control of a shared buffer control circuit 13.

In a write cycle, the shared buffer control circuit 13 analyzes the header of each cell outputted from the multiplexer circuit 10, and writes each cell in the shared buffer 11 while forming a linked list structure (queue) made of address chains for each output line. In a read cycle, the shared buffer control circuit 13 designates a read queue and reads a cell from this queue.

Cells read from the shared buffer 11 are periodically distributed in a predetermined order to output ports L15-1 to L15-n by a demultiplexer circuit DMX 12. Each cell is then passed through a congestion information addition circuit 14-i (i is an integer of 1 to n) provided for each output port and outputted from a switch output line (output port) L2-i (i=1 to n). Only one congestion information addition circuit 14-i (i=1 to n) may be provided to the input side (on L13) of the demultiplexer circuit DMX 12.

Unnecessary header information of a cell inputted via the line L2-1 to the line interface 2-1 is removed by a header converter circuit 24'. Thereafter, the cell is inputted to the cell sync circuit 23 to synchronize the cell and change the timing thereof to the clocks used on the optical transmission line. Thereafter, the cell is inputted to the SDH termination circuit 22. The cell subjected to the SDH termination process by the SDH termination circuit 22 is converted into an optical signal by the Electronics/Optics (E/O) converter circuit 21 and sent to the line (optical fiber) L3-1.

In the structure shown in FIG. 1, the switch 1 has the shared buffer 11. The shared buffer control circuit 13 can observe the cell congestion state of each queue of the shared buffer 11. If the amount of cell in some queue of the shared buffer 11, e.g., the j-th queue storing cells to be outputted to the output port L15-j, exceeds a predetermined threshold value, it is assumed that the queue is in the congestion state. In this case, the shared buffer control circuit 13 notifies each congestion information addition circuit 14-1 to 15-n of a congestion occurrence at the j-th queue (output port L15-j). In response to this notice, control information indicating a congestion occurrence (hereinafter called congestion information) at the j-th queue is added to all cells read from the shared buffer 11.

Upon reception of an output cell added with the congestion information, each line interface 2-1 to 2-n can know a congestion occurrence. For example, in the line interface 2-1, the input buffer control circuit 26 derives the congestion information from the output cell and suppresses reading a cell destined for the output port L15-j from the input buffer 25. This suppression of the cell destined for the congestion port continues until a notice of control information indicating a recovery of the congestion state of the queue of the shared buffer 11 is supplied.

Figure 2:
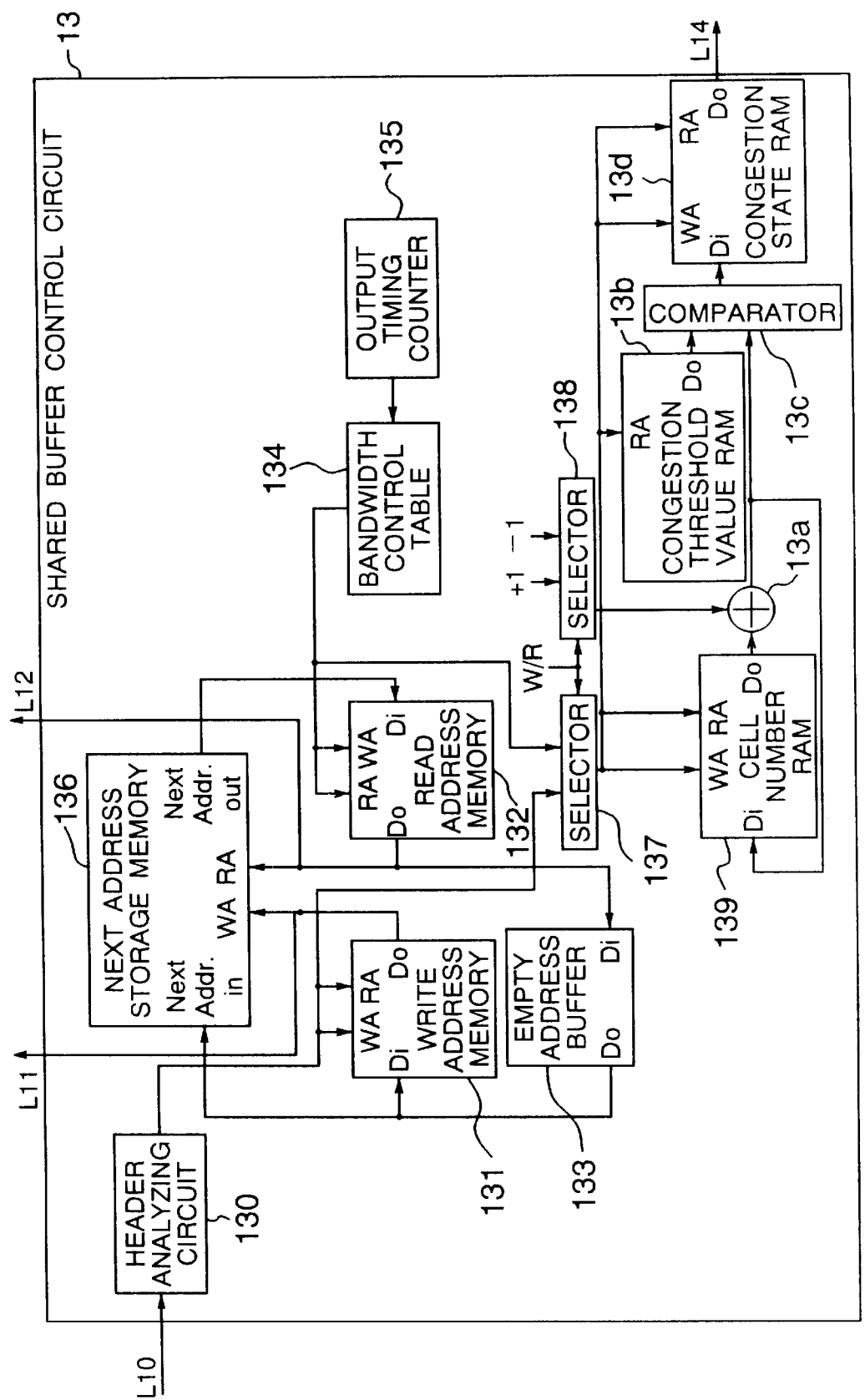
FIG. 2 is a block diagram showing an example of the structure of a shared buffer control circuit 13 shown in FIG. 1.

FIG. 2 shows an embodiment of the shared buffer control circuit shown in FIG. 1.

The shared buffer control circuit 13 forms a plurality of queues corresponding to the output lines in the shared buffer 11, each queue executing a logical First-In First-Out (FIFO) operation. These queues are realized by representing the cell storage areas by linked list structures made of address chains, by using a next address storage memory 136, a write address memory 131, a read address memory 132, and an empty address buffer 133.

The next address storage memory 136 stores an address (pointer address) train for each queue, the train indicating the storage areas of cells in the shared buffer to be sequentially read. The write address memory 131 stores an address in the shared buffer 11 at which the last cell of each queue is written. As the address in the write address memory 131 is outputted, the cell on the line L10 is written in the corresponding queue in the shared buffer 11. At the same time, the address stored in the write address memory 131 is written in the next address storage memory 136 as the address (pointer address) of the last cell of the queue. Each time a cell arrives at the line L10, the write address memory 131 supplies a write address of the arrived cell corresponding to the output port number (queue number) designated by the cell header.

The read address memory 132 stores a read address of a cell to be next read, for each queue number. The empty address buffer 133 stores an address of an empty area not used for queues in the shared buffer 11 (an address at which a cell to be read is not stored). An address to be next written is supplied from the empty address buffer 133 to the write address memory 131.

The cell write operation to the shared buffer 11 is performed in the following manner.

When a cell is supplied from the multiplexer circuit 10 via the line L10, a header analyzing circuit 130 analyzes the cell header, and supplies the queue number corresponding to the output line in which queue the arrived cell is stored, to the write address memory 131. A write address of the next cell for the queue number, stored at a previous time as a pointer address, is read from the write address memory 131. This address is supplied via an address line L11 to the shared buffer 11 (FIG. 1) as a write address so that the arrived cell is written in the shared buffer 11 at the write address.

The next cell write address read from the write address memory is also used as a write signal (WA) to be stored in the next address storage memory 136 and as a queue designation signal. An empty address read from the empty address buffer 133 is stored in the next address storage memory 136, and in response to reading an address from the write address memory 131, the empty address is stored as the next address (pointer address) corresponding to the output line of the arrived cell written in the shared buffer 11.

The empty address buffer 133 supplies the next empty address (pointer address) to the write address memory 131 (and also to the next address storage memory 136). A new pointer address in place of the old pointer address is therefore stored in the write address memory 131 at the queue corresponding to the arrived cell queue number.

With the above operations being repeated, a plurality of cells in the shared buffer constitute cell queues wherein cells are sequentially chained by the pointer address stored in the next address storage memory 136. Each time a cell arrives, it is added to the cell queue corresponding to the output line of the arrived cell.

The cell read operation from the shared buffer 11 is performed in the following manner.

Referring to FIG. 1, in response to a timing signal outputted from an output timing counter 135, a queue number is outputted from a bandwidth control table 134, and a read address (pointer address) of a first cell in a queue of the shared buffer corresponding to the queue number is outputted from the read address memory 132. This read address is supplied via an address line L12 to the shared buffer (FIG. 1). The first cell corresponding to the queue number is therefore read from the shared buffer. The read address is also supplied to the next address storage memory 136 as a read signal (RA) and as a queue designation signal. Therefore, when the cell is read from the shared buffer 11, the pointer address of the cell next read from the queue is read from the read address memory 136. This pointer address is stored in the read address memory 132 as the next pointer address. The read address is stored in the empty address buffer 133 as an empty address after the cell and the next pointer address are read.

In FIG. 2, detection of a congestion state and generation of congestion information are performed by a circuit portion including a first selector 137, a second selector 138, a cell number RAM 139, an adder 13a, a congestion threshold value RAM 13b, a comparator 13c, and a congestion state RAM 13d.

The first selector 137 selects a write queue number outputted from the header analyzing circuit 130 for a cell write operation, and for a cell read operation it selects a queue number read from the bandwidth control table 134. The second selector 138 outputs "+1" for the cell write operation, and "−1" for the cell read operation. The cell number RAM 139 stores the number of cells stored in the shared buffer at each queue number, and supplies the cell number corresponding to the queue number selected by the first selector 137.

The cell number supplied from the cell number RAM 139 is added to an output value of the second selector 138 by the adder 13a, and incremented by "1" for the write operation and decremented by "1" for the read operation. The cell number updated by the adder 13a is stored in the cell number RAM 139 and inputted to the comparator 13c. The comparator 13c compares the updated cell number with a congestion threshold value corresponding to the queue number and read from the congestion threshold value RAM 13b, and outputs state information corresponding to the comparison result. If the cell number is in excess of the congestion threshold value, state information indicating that the queue is in a congestion state, is outputted. State information outputted from the comparator 13c is stored in the congestion state RAM 13d.

The congestion state RAM 13d includes a plurality of bits having bit positions corresponding to respective queue numbers. The bit of the queue number in the congestion state is set to "1", and the bit of the queue number in the normal state is set to "0", to store the state of each queue in a bit map format. Bit map information stored in the congestion state RAM 13d is read as a control signal (congestion state signal) to the line L14 each time a cell is read from the shared buffer 11, and supplied to the congestion information addition circuits 14-1 to 14-n.

FIGS. 3A and 3B show formats of an output cell (FIG. 3A) from the header converter circuit 24 and an output cell (FIG. 3B) from the congestion information addition circuit 14.

In the ATM switching system shown in FIG. 1, a cell is inputted from the input line to the header converter circuit 24 of the line interface, for example, in the NNI cell format. In accordance with parameter information previously stored in a header converter table, the header converter circuit 24 performs a VPI/VCI conversion of each input cell and adds a queue number as an addition header to convert the input cell into a cell having the internal format shown in FIG. 3A. The header converted cell is inputted to the switch 1. The queue number of the addition header is analyzed by the shared buffer control circuit 13, and in accordance with the queue number, a cell read/write operation of the shared buffer is executed.

In the switch 1, cells read from the shared buffer 11 to the lines L15-1 to L15-n are inputted to the congestion information addition circuits 14-1 to 14-n at which the congestion information is added to form a cell format shown in FIG. 3B. This congestion information is added in accordance with a congestion state signal supplied from the congestion state RAM 13a of the shared buffer control circuit 13 to the line L14. The congestion information indicates a congestion state of each queue. Upon reception of a cell from the line L2, the input buffer control circuit 26 of each line interface 1 derives the congestion information added to the addition header, and controls the read operation so as to suppress outputting a cell having the queue number in the congestion state from the input buffer 25, until the congestion state is dissolved. With this control operation, a new cell is not added to the queue in the congestion state so that the queue length is gradually shortened, the congestion state is dissolved, and the normal state is recovered.

If the number of queues to be processed by the shared buffer control circuit 13 increases, the congestion information of the addition header requires a number of bits. For example, in order to process 128 queues and represent the congestion state of each queue in the bit map format, 128 bits are required for the congestion information of the addition header. In order to reduce the number of bits of the congestion information, serial numbers "1" to "4" are periodically assigned to the cells of each queue, and the congestion information of the 1st to 32nd, the 33rd to 64th, the 65th to 96th, and the 97th to 128th queues is added to the first to fourth cells respectively. With this arrangement, addition bits required for the congestion control include the serial numbers (in this example, 2 bits) and 32 bit. In this case, however, the congestion state of all queues can be known only after four cells having different serial numbers are received.

Figure 4:
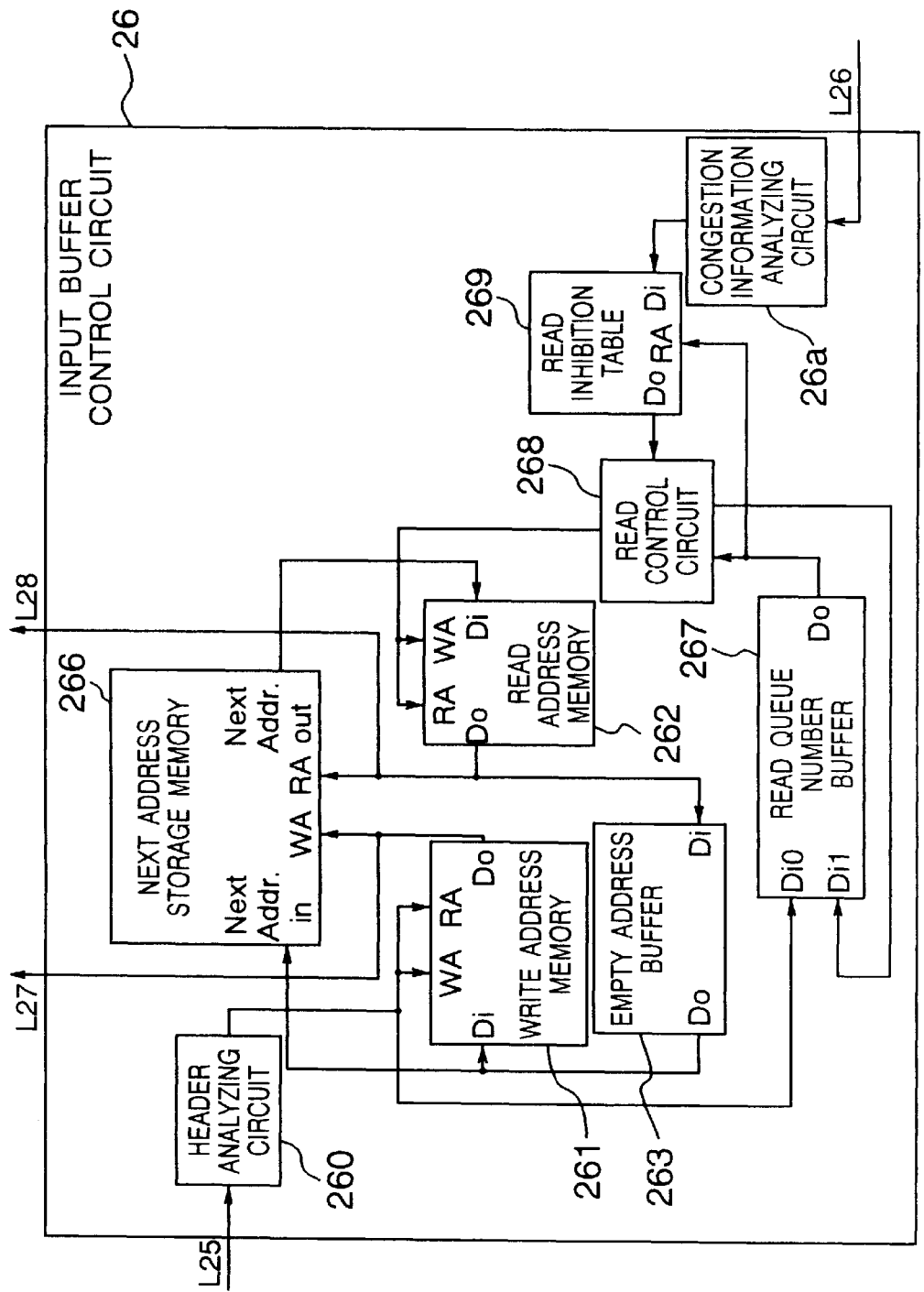
FIG. 4 is a block diagram showing an example of the structure of an input buffer control circuit shown in FIG. 1.

FIG. 4 shown an embodiment of the input buffer control circuit 26 of the line interface 2.

The input buffer control circuit 28 forms a plurality of queues performing a logical FIFO on the input buffer 25 (FIG. 1) by using a linked list structure. These queues are in one-to-one correspondence with the logical queues formed on the shared buffer 11 of the switch 1.

The queues of the linked list structure can be formed on the input buffer 25 by using a next address storage memory 266, a write address memory 261, a read address memory 262, and an empty address memory 263 shown in FIG. 4, having the similar structures of the elements 136, 131, 132, and 133 of the shared buffer control circuit 13 shown in FIG. 2. The queues operate in the similar manner as those formed by the shared buffer control circuit 13.

Specifically, the next address storage memory 266 stores a write address (pointer address) of a cell to be next arrived, for each queue. The write address memory 261 stores the latest pointer address stored in the next address storage memory 266 for each queue, the latest pointer address corresponding to the latest cell in the input buffer 25. When a cell arrives, in accordance with the queue number outputted from the header analyzing circuit 260 the pointer address corresponding to the queue is read from the write address memory 261. By using this pointer address as the write signal (WA) and as the queue designation signal, the cell is written in the buffer 25 and the next pointer address is written in the next address storage memory 266. The next pointer address is supplied from the empty address buffer 263, and stored in the write address memory 261 as the new pointer address of the queue in place of the old pointer address at the same time when it is stored in the next address storage memory 266.

Reference numeral 267 represents a queue number buffer for storing a queue number train outputted from the header analyzer circuit 260 each time a cell arrives. In the cycle of reading a cell from the input buffer 25, the queue number outputted from the read queue number buffer 267 is inputted to a read control circuit 268 and to a read inhibition table 269. Reference numeral 26a represents a congestion information analyzing circuit which derives the congestion information (FIG. 3B) from the addition header of each cell supplied from the line L26 and writes the state information indicating a presence/absence of congestion (read inhibition) in a read inhibition table 269 for each queue.

The read inhibition table 269 supplies a read inhibition signal to the read control circuit 268 if the queue number supplied from the queue number buffer 267 is in the read inhibition state, and supplies a read permission signal if not in the read inhibition state. When the inhibition signal is supplied from the read inhibition table 269, the read control circuit 268 returns the queue number to the read queue number buffer 267, whereas when the permission signal is supplied, the queue number is outputted to the read address memory 262.

The read address memory 262 stores a pointer address train of cells to be next read, for each queue, and supplies the pointer address of the cell to be first read from the input buffer 25 corresponding to the queue number designated by the read control circuit 268. By using this pointer address as a read address, the first cell in the queue is read from the input buffer. At the same time, a new pointer address is read from the next address storage memory 266. This new pointer address is stored in the read address memory 262 in correspondence with the queue number. The pointer address which became unnecessary by reading the cell is stored in the empty address buffer 263.

With the structure described above, if all queues in the switch 1 are in the normal state, queue numbers are sequentially outputted from the read queue number buffer 267 in the order starting from the first stored queue number, and cells in the queues of the input buffer 25 corresponding to the queue numbers are sequentially read in the order starting from the first inputted cell and supplied to the switch 1.

If there is any queue in the switch 1 in the congestion state, an access to the queue is inhibited by the functions of the read inhibition table 269 and read control circuit 268, and other cells of the other queues arrived thereafter are read. Therefore, a supply of a cell to the queue in the switch 1 in the congestion state is suppressed so that the congestion in the switch 1 is dissolved. For the queue under the congestion state, the queue number with cell read inhibition is again written at the last position of the queue number buffer 267 by the read control circuit 268. Therefore, the queue number is left in the queue number buffer 267 as many as the number of cells stored in the congested queue. As a result, after the congestion state is dissolved, all the cells stored in the input buffer 25 are read by repetitively outputting the queue number from the queue number buffer 267.

Figure 5:
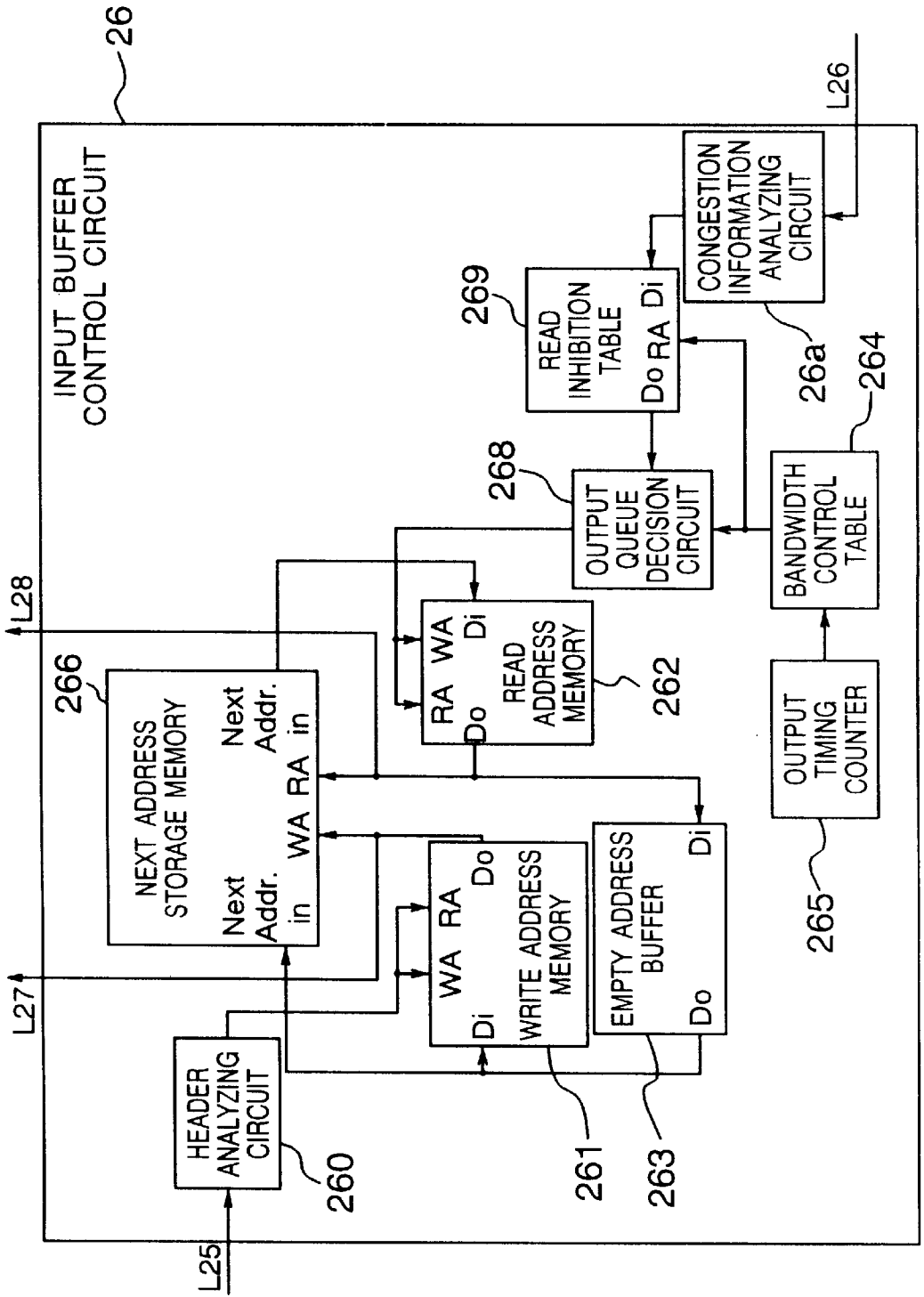
FIG. 5 is a block diagram showing another example of the structure of the input buffer control circuit shown in FIG. 1.

FIG. 5 shows the structure of another embodiment of the input buffer control circuit 26.

In the input buffer control circuit 26 of this embodiment, the operations of writing a cell in the input buffer 25 and writing a pointer address in the next address storage memory 266 are similar to the embodiment shown in FIG. 4. The operation of the circuit portion for controlling reading a cell from the input buffer 25 is different from the embodiment shown in FIG. 4 in the following points.

Reference numeral 265 represents an output timing counter. In response to a timing signal (count value) outputted from the counter 265, a queue number is outputted from the bandwidth control table 264 and inputted to the read inhibition table 269 and to an output queue decision circuit 26b. The bandwidth control table 264 stores a predetermined queue number train. Each time the count value changes, the stored queue numbers are sequentially read from the bandwidth control table 264. Similar to the first embodiment, the read inhibition table 269 stores a presence/absence of congestion of each queue in accordance with an instruction from the congestion information analyzing circuit 26a, and outputs a read inhibition signal or a read permission signal in accordance with the state of the queue corresponding to the queue number outputted from the bandwidth control table 264.

Reference numeral 26b represents an output queue decision circuit for controlling a transfer of a queue number outputted from the bandwidth control table 364 to the read address memory 262 in accordance with an output of the read inhibition table 269. Only the queue number for which the read inhibition signal is not outputted from the read inhibition table 269, is selectively supplied via the decision circuit 26b to the read address memory 262. In response to this, a pointer address is outputted from the address memory 262. By using this pointer address as the read address, the cell in the queue of the input buffer 25 is read. The output queue decision circuit 26b may select, for example, the first queue number (having the highest priority) not inhibited by the read inhibition table 269, by making the bandwidth control table 264 output a plurality of queue numbers in the priority order in each read cycle.

In the method of this embodiment, if there is no queue in the congestion state in the switch, the cell is read from the input buffer 25 in the queue designated by the bandwidth control table 264 (if a plurality of queues are designated, the queue having the highest priority is selected). If there is a queue in the congestion state, a cell is read from the output butter, which cell is not in the congestion queue among the queues designated by the bandwidth control table 264.

If the throughput (bandwidth) of cells from the input side of the ATM switching system to the output side (output queue logically structured on the shared buffer shown in FIG. 1) is constant and does not vary, then cells may be outputted from the output buffer 25 in accordance with the bandwidth set by the bandwidth control table 264, without performing a control matching the congestion state on the output side. In this case, the congestion state in the output queues will not be generated so long as the bandwidth is set so that the total of cell bandwidths of cells from respective input line interfaces to an output queue does not exceed the bandwidth of the output queue. For example, assuming that the queue numbers are "1" to "4" and the bandwidth control table 264 outputs the queue numbers "1", "1", "1", "2", "3", "3", and "4" in this order, the cells of the queue number "1" are read three times the number of cells of the other queue numbers "2" and "4", and the cells of the queue number "3" are read two times the number of cells of the other queue numbers "2" and "4", if read inhibition is not issued.

In the ATM switching system described with FIGS. 1 to 5, cell read/write of the shared buffer 11 in the switch 1 is performed by a "shared buffer control scheme". It is therefore possible to set the total of congestion threshold values of respective queues to a value in excess of the cell storage capacity of the shared buffer 11. The congestion state occurs generally when traffic is concentrated on a particular output queue. Even if the particular output queue requires a large buffer capacity, the buffer capacity required for other output queues is small because the other output queues have a reduced traffic amount. Therefore, a probability that cells overflow from the shared buffer 11 before the all output queues enter the congestion state, is very small as a whole.

In an "output buffer control scheme" which divides an output buffer into fixed capacity banks for respective queues and supervises a cell input/output of each bank, the total of congestion threshold values of respective queues is not possible to be set in excess of the total capacity of the shared buffer 11. This is because cell discard occurs before a congestion state is detected if the congestion threshold value is set in excess of the buffer capacity of each bank.

With the shared buffer control scheme, the total of congestion threshold values of respective queues can be set to a value in excess of the total capacity of the shared buffer 11. Therefore, the congestion threshold value can be set larger than the output buffer control scheme. In combination with the cell output suppression control at the input buffer side, an excellent switching system with a small cell discard rate can be provided.

Other system structures presupposing cell discard may be used. For example, instead of the input buffer 25 for temporarily storing cells destined for the queue in the congestion state, a circuit for discarding cells destined for the congested queue may be used. Alternatively, a cell output is supervised in the unit of packet. In this case, for a packet already outputting some cell during the congestion state, succeeding cells are also outputted, and cells belonging to a new packet and destined for the congested queue are all discarded.

Consider packet communications, particularly communications using ATM Adaptation Layer Type 5 (AAL5), in which if even one cell among cells constituting a packet is discarded, all cells of the packet are required to re-transfer. In this case, a packet throughput of a network system can be improved efficiently if a packet unit discard is started for cells of a newly arrived packet prior to occurrence of cell discard in the congested queue, because a possibility of discarding cells of a packet already outputting some cell can be reduced considerably. In this cell discard scheme in the unit of packet, if all cells of a packet is discarded, a terminal on the reception side cannot detect a discard of the packet or cells in the network. Therefore, in the packet unit cell discard control, it is desired to pass at least one cell in each packet, for example, at least the last cell. In AAL5, each reception terminal checks any error of packet data. Therefore, if the last cell arrives, this error check can detect a cell discard or any error of packet data so that a re-transmission request can be sent to a transmission terminal.

Figure 6:
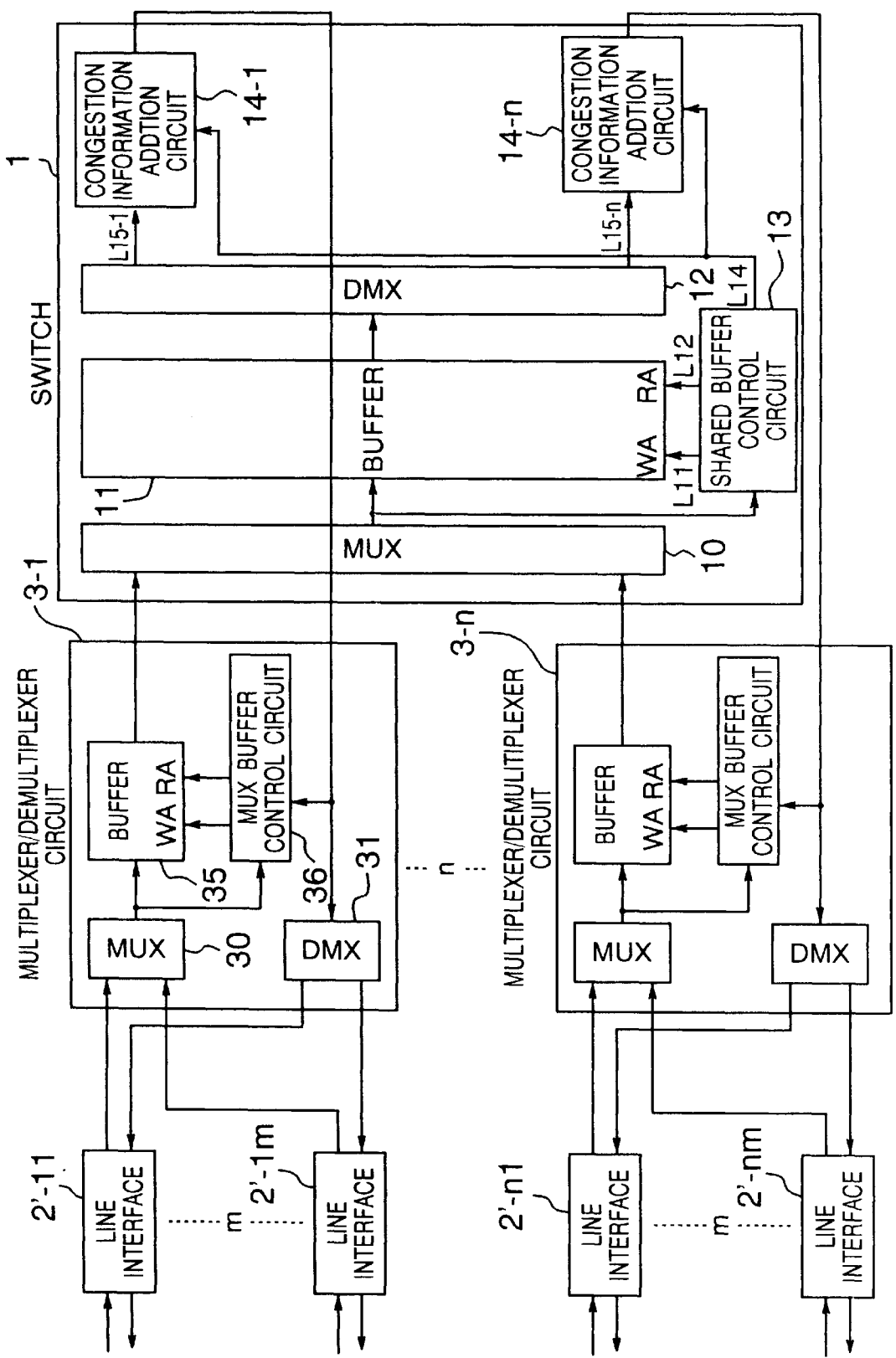
FIG. 6 is a block diagram showing the structure of an ATM switching system according to a second embodiment of the invention.

FIG. 6 shows the structure of a switching system according to the second embodiment of the invention.

In this embodiment, a multiplexer/demultiplexer circuit 3 (3-1 to 3-n) is provided at each input port of the switch 1, and the circuit 3 accommodates a plurality of grouped line interface circuits 2' (2'-11 to 2'-nm).

Each line interface circuit 2' has the structure that the input buffer 25 and input buffer control circuit 26 are removed from the line interface circuit 2 shown in FIG. 1 (the structure of a circuit portion of the line interface circuit 2 on the left side of a broken line shown in FIG. 1). As an alternative of this removed circuit portion, the multiplexer/demultiplexer 3 has an input buffer 35 and a MUX buffer control circuit 36. Specifically, the input buffer 35 and MUX buffer control circuit 36 of the multiplexer/demultiplexer circuit 3-1 shares a plurality of grouped line interfaces. The structure of the switch 1 is the same as that shown in FIG. 2, and a plurality of logical FIFO queues are formed on the shared buffer 11 in correspondence to respective output lines. When the shared buffer control circuit 13 detects a congestion state of a queue, the queue number in the congestion state is notified to the congestion information addition circuits 14-1 to 14-n which add congestion information to the addition headers of the cells and transfer them to corresponding multiplexer/demultiplexer circuits 3.

Each multiplexer/demultiplexer circuit 3 includes a multiplexing circuit MUX 30, a demultiplexing circuit DMX 31, the input buffer memory 35, and the MUX buffer control circuit 36. The multiplexing circuit MUX 30 multiplexes input cells supplied from a plurality of grouped line interfaces 2' assigned to the circuit 3. The demultiplexing circuit DMX 31 receives cells outputted from the congestion information addition circuit 14 and periodically distributes them to corresponding ones of the plurality of line interfaces 2'. The input buffer memory 35 temporarily stores cells supplied from MUX 30. The MUX buffer control circuit 36 controls a cell read/write of the input buffer memory 35. The switch 1 performs a bandwidth control while considering an output timing of each cell at DMX 31 to realize cell switching between respective line interfaces.

The MUX buffer control circuit 36 analyzes the queue number in the congestion state by using congestion information contained in the addition header of a cell received from the output port of the switch, and controls reading a cell from the input buffer 35 so as to inhibit the output of the cell to the congested queue.

The MUX buffer control circuit 36 can fundamentally adopt the same structure as the input butter control circuits shown in FIG. 4 and 5. A plurality of queues corresponding to the queues on the shared buffer 11 of the switch 1 are formed on the input buffer 35. If any queue on the shared buffer 11 enters the congestion state, a cell is suppressed from being read from the corresponding queue on the input buffer 35.

Figure 7:
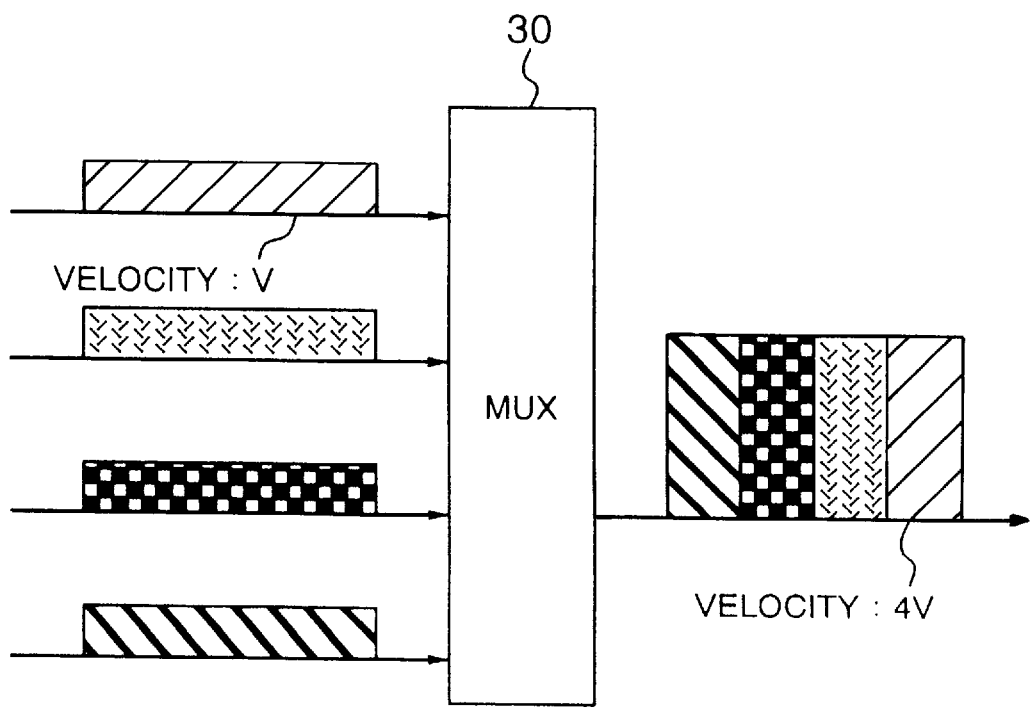
FIG. 7 is a timing chart illustrating the function of MUX 30 in a multiplexer/demultiplexer circuit 3 shown in FIG. 6.

FIG. 7 illustrates the function of MUX 30.

In this example shown in FIG. 7, four cells inputted from the line interfaces 2'-11 to 2'-14 at a speed V are multiplexed and transferred to the input buffer 35 as a cell at a speed 4V.

In a general switching system, cells outputted from MUX connected to an input port of the switch 1 is directly inputted to the switch 1. In this embodiment, in order to suppress outputting a cell to the switch 1 when any queue in the switch 1 enters the congestion state, cells outputted from MUX 30 are temporarily stored in the input buffer 35 and selectively transferred to the switch 1 in accordance with the state of an output queue.

In the structure of this embodiment, a plurality of line interfaces 2' of one group share the input buffer 35 in the multiplexer/demultiplexer circuit 3 required for the congestion control. If a particular output queue of the switch 1 enters the congestion state, cells of the traffic destined from one input line for the congested output queue is concentrated on a particular input queue. Even in such a case, this particular input queue can efficiently use the capacity of the input buffer 35 so long as the cells from the other input lines generate the congestion state in the input buffer 35 and the particular input queue does not constrain buffering. Therefore, as compared to the first embodiment, the cell discard rate can be reduced further. In FIG. 6, it is not necessary for all input/output ports of the switch 1 to be accommodated by the input/output lines via the multiplexer/demultiplexer circuits, but only some input/output ports may be connected to independent line interfaces such as shown in FIG. 1.

Figure 8:
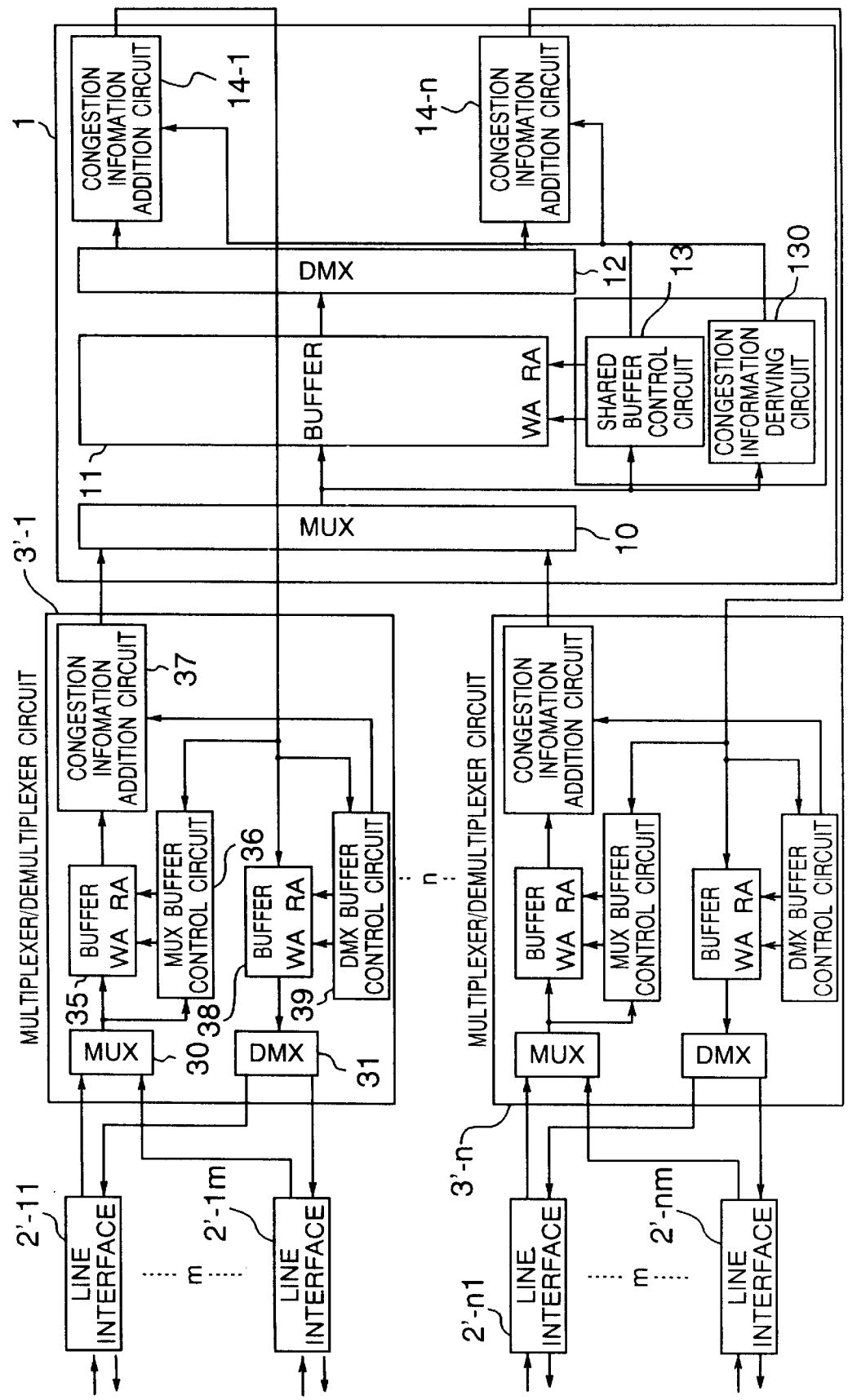
FIG. 8 is a block diagram showing the structure of an ATM switching system according to a third embodiment of the invention.

FIG. 8 shows the structure of an ATM switching system modified from the second embodiment, according to the third embodiment of the invention.

In this embodiment, each multiplexer/demultiplexer circuit 3' (3'-1 to 3'-n) has an output buffer 38 and a DMX buffer control circuit 39 on the input side of DMX 31 and a congestion information circuit 37 at the back stage of the input buffer 35 on the MUX 30 side. By using an overhead of cells flowing in the switch 1, congestion information is supplied from a congestion detection point (DMX buffer control circuit 39) to a control point (MUX buffer control circuit 36).

The structure of the DMX buffer control circuit 39 is the same as the shared buffer control circuit 13 shown in FIG. 2. A plurality of logical FIFO queues are formed on the output buffer 38. If any queue on the output buffer 38 enters the congestion state, the DMX buffer control circuit 39 supplies the congestion information to the congestion information addition circuit 37. The queue number in the congestion state is added to the cell header and thereafter, the input cell is supplied to the switch 1.

The input cells are multiplexed by MUX 10 of the switch 1, and written in the shared buffer 11 under the control of the shared buffer control circuit 13. In this case, a congestion information deriving circuit 130 analyzes the addition header of the input cell, detects the congestion state of a particular queue number, for example, in the multiplexer/demultiplexer circuit 3'-i, and notifies the congestion information addition circuits 14-1 to 14-n of the queue number in the congested state. In addition, also when the shared buffer control circuit 13 detects a particular queue number in the congestion state in the shared buffer 11, this particular queue number is notified to the congestion information addition circuits 14-1 to 14-n.

Therefore, the congestion state in the multiplexer/demultiplexer circuit 3'-i and/or in the shared buffer 11 is notified to the multiplexer/demultiplexer circuits 3'-1 to 3'-n. In each multiplexer/demultiplexer circuit 3', the MUX buffer control circuit 36 forms a plurality of queues on the input buffer 35 corresponding to the queues on the DMX side output buffers 38 of all the other multiplexer/demultiplexer circuits (or corresponding to the queues on the shared buffer 11 in the switch 1). When each multiplexer/demultiplexer circuit 3' is notified of a congestion state of a particular queue in the DMX side buffer of any of the other multiplexer/demultiplexer circuits, it suppresses the cell in the queue corresponding to the particular queue from being outputted from the input buffer 35.

Figure 9:
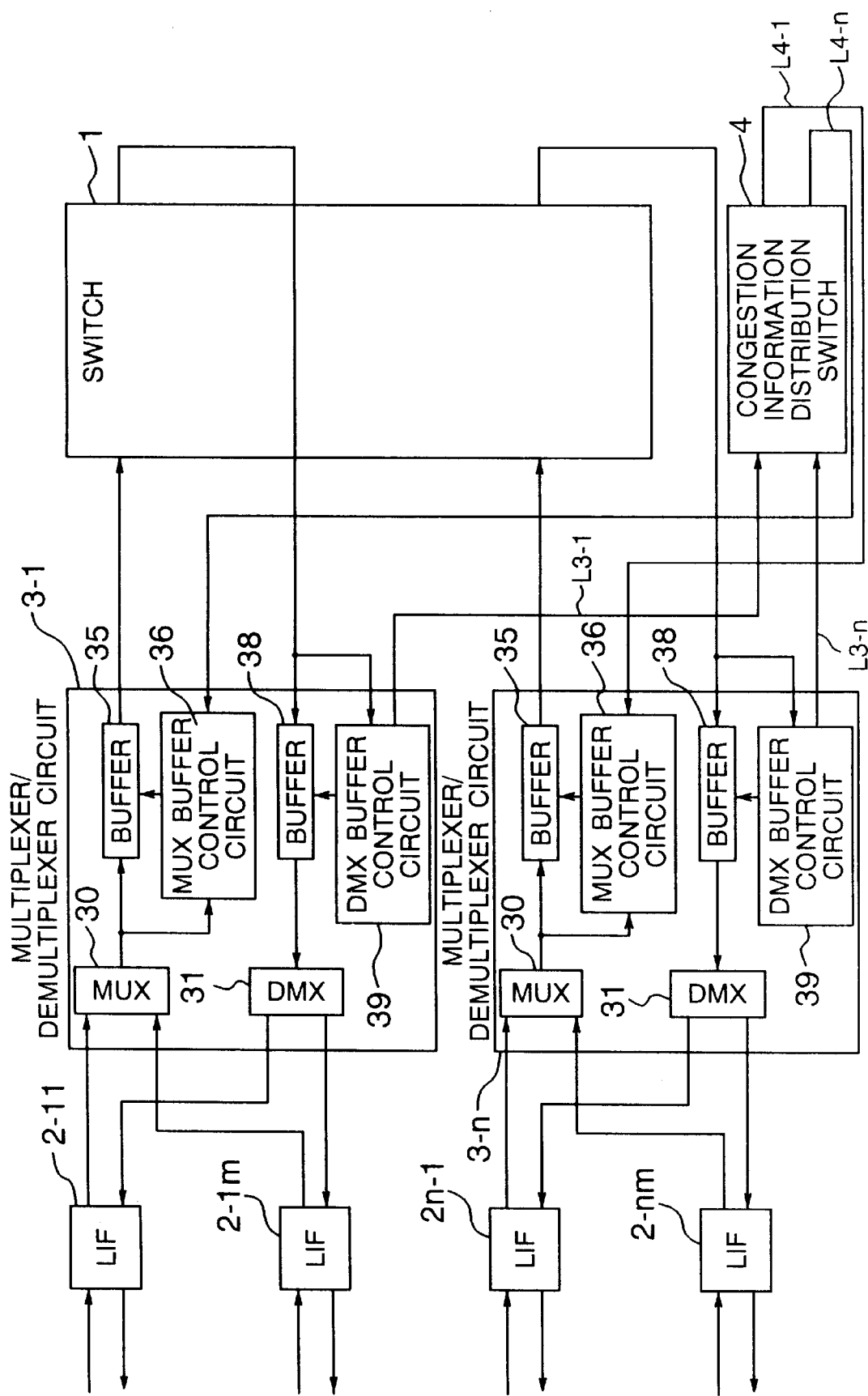
FIG. 9 is a block diagram showing the structure of an ATM switching system according to a fourth embodiment of the invention.

FIG. 9 shows the structure of a switching system according to the fourth embodiment of the invention.

In this embodiment, instead of using an overhead of cells flowing in the switch 1, signal lines (congestion information notice lines) L4-1 to L4-n are provided on the switch 1 side which are dedicated for the congestion information notice. Congestion information is supplied from the congestion detection point to the congestion control point via each congestion information notice line L4-1 to L4-n. As compared to the third embodiment shown in FIG. 8, the feature of this embodiment resides in a congestion information distribution switch 4 which is connected to a plurality of multiplexer/demultiplexer circuits 3-1 to 3-n via the congestion information notice lines L3-1 to L3-n and L4-1 to L4-n. Specifically, congestion information outputted from the DMX buffer control circuit 39 of each multiplexer/demultiplexer circuit 3 is transferred via the congestion information distribution switch 4 to the MUX buffer control circuit 36 of each multiplexer/demultiplexer circuit 3.

Figure 10:
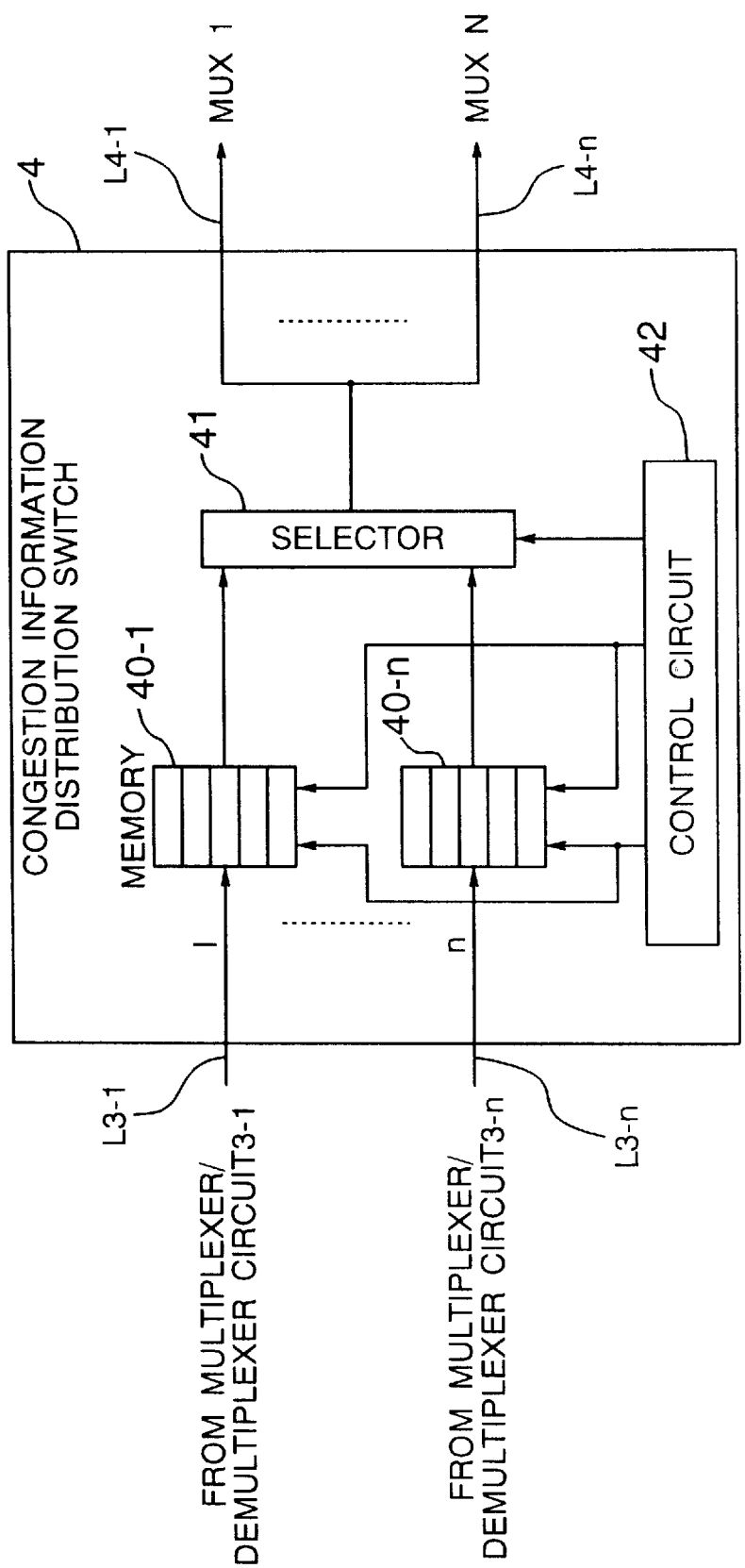
FIG. 10 is a block diagram showing the structure of a congestion information distribution switch 4 shown in FIG. 9.

An example of the structure of the congestion information distribution switch 4 is shown in FIG. 10.

The congestion information distribution switch 4 includes a plurality of memories 40-1 to 40-n, a selector 41 for selectively outputting an output of a particular memory among the memories 40-1 to 40-n, and a control circuit 42 connected to the memories and selector.

Figure 11A:
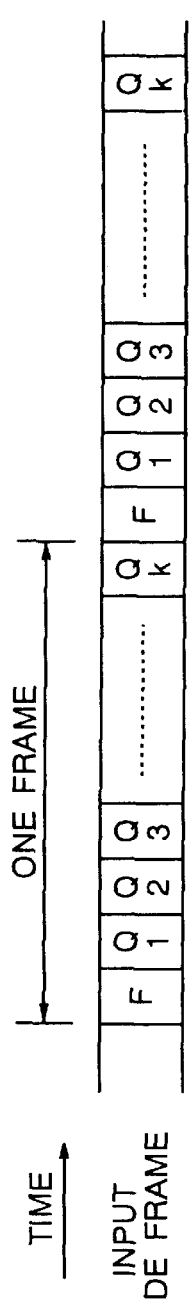
FIGS. 11A and 11B show input and output frames transferred between each multiplexer/demultiplexer circuit 3 and the congestion information distribution switch 4.

The DMX buffer control circuit 39 of each multiplexer/demultiplexer circuit 3 always monitors the state of logical queues formed on the output buffer 38, and periodically notifies the monitor result (congestion information) to the congestion information distribution switch 4 via the congestion information notice line. In order to periodically notify the congestion information, a frame (input side frame) shown in FIG. 11A is used.

The input side frame has a frame sync pattern F and a plurality of areas Q1 to Qk indicating the states of respective queues, each area being assigned with one bit. An area set with a binary "1" indicates that the length of a logical queue corresponding to the area is longer than a threshold value, and an area set with a binary "0" indicates that the length of the logical queue is shorter than the threshold value. Each DMX buffer control circuit 39 always monitors the length of each logical queue on the output buffer 38, and sets "1" to the area of a congested logical queue of the input side frame if the logical queue length exceeds the preset threshold value.

The congestion information distribution switch 4 temporarily writes the congestion information supplied from each multiplexer/demultiplexer circuit 3-1 to 3-n in the corresponding memory 40 (40-1 to 40-n). Each memory has the capacity sufficient for storing the congestion information of the logical queues of each multiplexer/demultiplexer circuit. Since the congestion information is periodically sent from each multiplexer/demultiplexer circuit by the frame shown in FIG. 11A, the control circuit 42 controls the memories 40-1 to 40-n so as to overwrite the congestion information and periodically store it.

The congestion information stored in each memory 40-1 to 40-n is periodically and sequentially read under the control of the control circuit 42. Specifically, after the congestion information on the k logical queues of the multiplexer/demultiplexer circuit 3-1 is read from the memory 40-1, the congestion information on the k logical queues of the multiplexer/demultiplexer circuit 3-2 is read from the memory 40-2. The similar operations are repeated to read the congestion information from all the memories 40-1 to 40-n. This sequential read of the congestion information can be achieved by accessing the memories 40-1 to 40-n at the same time, and of the congestion information read in parallel from the memories 40-1 to 40-n, the output of a particular memory is selectively picked up by the selector 41.

Figure 11B:
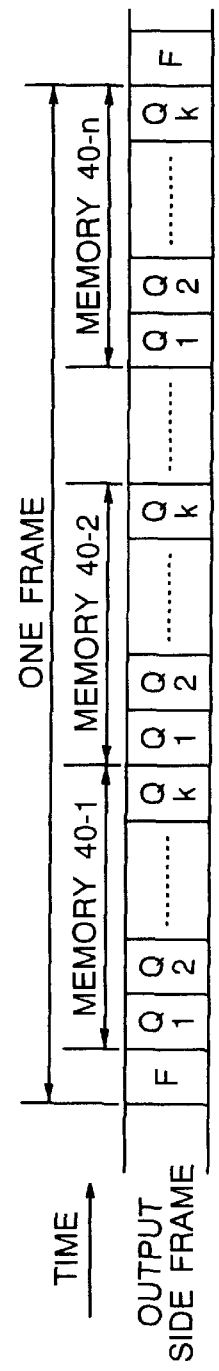

The congestion information read from the memory is mapped on an output side frame shown in FIG. 11B. The same frame is broadcast and distributed to the multiplexer/demultiplexer circuits 3-1 to 3-n. As shown in FIG. 11B, the output side frame has a storage capacity sufficient for storing the congestion information, transferred from the multiplexer/demultiplexer circuits 3-1 to 3-n to the congestion information distribution switch 4, in one frame and broadcasting the same frame to the multiplexer/demultiplexer circuits 3-1 to 3-n. By using the congestion information received from the output side frame, the MUX buffer control circuit 36 of each multiplexer/demultiplexer circuit 3 executes the buffer control similar to the third embodiment.

In the fourth embodiment, the congestion information distribution switch is used for distributing the congestion information to each control point. Therefore, as compared to the scheme in which the detection points and control points are directly connected in a mesh form, the number of congestion information notice lines can be reduced.

In the fourth embodiment, although the congestion information on all queues obtained at each detection point is periodically transferred to each control point via the distribution switch, the congestion information may be transferred to the control point only when a congestion is detected. For example, only when the DMX buffer control circuit 39 of each multiplexer/demultiplexer circuit 3 serving as the congestion detection point detects a congestion, the congested logical queue number is notified to the congestion information distribution switch 4. This switch 4 then stores the congestion information (the congested queue number) in the memory. Next, under the control of the control circuit 42, the queue number stored in the memory is broadcast to the multiplexer/demultiplexer circuits 3. When the congested queue restores the normal state, this state transition is notified to the congestion information distribution switch 4 in the manner like the above and is broadcast to the multiplexer/demultiplexer circuits 3.

The fourth embodiment applies the congestion information distribution switch to the switching system of the third embodiment. The method of distributing the congestion control information by the congestion information distribution switch may be used in combination with the switching systems of the other embodiments. For example, in the embodiment shown in FIG. 9, the switch 1 does not add congestion information of the shared buffer 11 to the cells, but only the DMX buffer control circuit 39 on the side of each multiplexer/demultiplexer circuit 3 generates the congestion information. Instead, the switch 1 may generate the congestion information of the shared buffer 11, and send it to each multiplexer/demultiplexer circuit. In this case, the DMX buffer control circuit combines the congestion information supplied from the switch 1 with the congestion information generated by the DMX buffer control circuit, and the combined congestion information is supplied to the distribution switch 4.

As appreciated from the foregoing description of the switching system of this invention, at least one of the input side buffer and output side buffer of the switch is used as a shared buffer commonly used by a plurality of output lines or input lines. Variable length logical buffers are formed on this shared buffer for each output line, and if a particular output line enters the congestion state of output cells, a supply of cells to the switch is suppressed.

Accordingly, for example, assuming that the output side buffer is used as the shared buffer, even if cells are concentrated on a particular output line, cells on the same particular output line can be stored in the shared buffer so long as the shared buffer has an empty capacity, thereby lowering a possibility that the output side buffer becomes full of cells. Therefore, in combination with suppressing a supply of cells from the input side, the cell discard rate can be lowered considerably.

Furthermore, assuming that the input side buffer is shared by a plurality of grouped input lines, even if traffic on a particular input line is concentrated on a particular output line, the capacity of the shared input side buffer can be used for the traffic on the particular input line so long as the traffic on the other input lines of the same group does not become an obstacle against the flow of cells, thereby avoiding a cell discard.

We claim:

1. A switching system connected to a plurality of input lines and a plurality of output lines, comprising:

a plurality of input buffers provided for said input lines;

a plurality of input buffer control circuits corresponding to said input buffers, each input buffer control circuit writes a packet arriving at one of said input lines in one of said input buffers and reads said packet from said one input buffers, said packet being distributed to one of said output lines as a destination;

a switch which temporarily stores packets read from the plurality of input buffers in a shared buffer, and distributes each packet to one of said output lines determined as a destination by header information of said packet;

a monitor circuit which monitors a storage state of packets in said shared buffer on a destination output line basis, and generates congestion control information representing a congested output line; and a congestion notifying circuit which notifies each of said input buffer control circuits of said congestion control information, wherein each of said input buffer control circuits decides whether to read said packet from said input buffer in accordance with said congestion control information.

2. A switching system connected to a plurality of input lines and a plurality of output lines, comprising:

a plurality of input buffers provided for said input lines;

a plurality of input buffer control circuits corresponding to said input buffers, each input buffer control circuit writes a packet arrived at one of said input lines in one of said input buffers and reads said packet from said one input buffer, said packet being distributed to one of said output lines as a destination;

a switch which temporarily stores packets read from the plurality of input buffers in a shared buffer, and distributes each packet to one of said output lines determined as a destination by header information of said packet;

a monitor circuit which monitors a storage state of packets in said shared buffer on a destination output line basis, and generates congestion control information representing a congested output line; and a congestion notifying circuit which notifies each of said input buffer control circuits of said congestion control information, wherein each of said input buffer control circuits decides whether to read said packet from said input buffer in accordance with said congestion control information, wherein said switch comprises:

a multiplexer which multiplexes packets read from said plurality of input buffers and outputs a multiplexed packet, a shared buffer control circuit which writes each packet outputted from said multiplexer in said shared buffer in accordance with the header information of the packet, and reads each packet from said shared buffer in a predetermined order, and a demultiplexer which distributes packets read from said shared buffer to corresponding output lines, wherein said shared buffer control circuit monitors the storage state of packets in said shared buffer and generates said congestion control information.

3. The switching system according to claim 2, wherein said shared buffer control circuit comprises:

a circuit which forms a plurality of variable length logical output queues corresponding to each output line, on said shared buffer, adds an output packet from said multiplexer to one of said output queues identified by the header information of the output packet, and reads a packet by accessing said plurality of output queues in a predetermined order; and a congestion control information generating circuit which generates congestion control information indicating an output line with excessive packets by detecting a congestion state from the number of packets in each of said output queues, wherein each of said input buffer control circuits suppresses reading a packet from said input buffer, said packet being distributed to a particular output line determined by said congestion control information.

4. The switching system according to claim 3, wherein said congestion control information generating circuit comprises:

a counter which counts the number of packets stored in each of said output queues;

a comparator which compares a count value of said counter with a predetermined threshold value; and a second circuit which generates said congestion control information for each of said output queues in accordance with the comparison result from said comparator.

5. The switching system according to claim 4, wherein said threshold value is set so that the total number of packets allowed to be stored in each of said plurality of output queues by said threshold value is in excess of the number of packets capable of being stored in said shared buffer.

6. The switching system according to claim 3, wherein said congestion control information generating circuit generates congestion control information indicating a presence/absence of congestion in said plurality of output queues on said shared buffer at the same time.

7. The switching system according to claim 2, wherein said congestion notifying circuit notifies each of said input buffer control circuits of said congestion control information, by using an output packet read from said shared buffer, said output packet being distributed to each output line by said demultiplexer.

8. The switching system according to claim 2, wherein said congestion notifying circuit includes a congestion control information addition circuit provided on the input side or output side of said demultiplexer, said congestion control information is added to a header of each output packet by said congestion control information addition circuit, and each input buffer control circuit derives said congestion control information from the header of an output packet received from each output line.

9. A switching system comprising:

a switch having a plurality of input ports and a plurality of output ports for causing a packet input from one of said input ports to be distributed to one of said output ports determined as a destination by header information of the packet; and at least one multiplexer/demultiplexer circuit which multiplexes input packets arriving from a plurality of input lines, inputs multiplexed packets into one of said input ports of said switch, and distributes an output packet received from one of said output ports of said switch one of a plurality of output lines, wherein said multiplexer/demultiplexer circuit includes an input buffer for temporarily storing said multiplexed input packets, and an input buffer control circuit which writes a packet into said input buffer and reads said packet to said input ports from said input buffer;

wherein said switch includes a congestion notifying circuit which detects a storage state of packets in said switch for each of said output lines, generates congestion control information indicating an excessive storage of packets relative to a particular output line, and notifies said input buffer control circuit of said congestion control information; and wherein said input buffer control circuit suppresses reading, from said input buffer, of a packet to be distributed to said particular output line which is determined as a congested output line by said congestion control information.

10. A switching system comprising:

a switch having a plurality of input ports and a plurality of output ports for causing a packet input from one of said input ports to be distributed to one of said output ports determined as a destination by header information of the packet; and at least one multiplexer/demultiplexer circuit which multiplexer input packets arriving from a plurality of input lines, inputs multiplexed packets into one of said input ports of said switch, and distributes an output packet received from one of said output ports of said switch to one of a plurality of output lines, wherein said multiplexer/demultiplexer circuit includes an input buffer for temporarily storing said multiplexed input packets, and an input buffer control circuit which writes a packet into said input buffer and reads said packet to said input ports from said input buffer;

wherein said switch includes a congestion notifying circuit which detects a storage state of packets in said switch for each of said output lines, generates congestion control information indicating an excessive storage of packets relative to a particular output line, and notifies said input buffer control circuit of said congestion control information;

wherein said input buffer control circuit suppresses reading, from said input buffer, of a packet to be distributed to said particular output line which is determined as a congested output line by said congestion control information; and wherein said multiplexer/demultiplexer circuit includes a multiplexer circuit for multiplexing packets transmitted at a speed v from N input lines and outputting a multiplexed packet at a speed N×v and a demultiplexer circuit for periodically causing an output packet, at the speed N×v, received from one of the output ports of said switch to be distributed to a corresponding one of N output lines and outputs said output packet to the corresponding output line at the speed v.

11. A switching system comprising:

a switch having a plurality of input ports and a plurality of output ports for causing a packet input from one of said input ports to be distributed to one of said output ports determined as a destination by header information of the packet; and at least one multiplexer/demultiplexer circuit which multiplexer input packets arriving from a plurality of input lines, inputs multiplexed packets into one of said input ports of said switch, and distributes an output packet received from one of said output ports of said switch to one of a plurality of output lines, wherein said multiplexer/demultiplexer circuit includes an input buffer for temporarily storing said multiplexed input packets, and an input buffer control circuit which writes a packet into said input buffer and reads said packet to said input ports from said input buffer;

wherein said switch includes a congestion notifying circuit which detects a storage state of packets in said switch for each of said output lines, generates congestion control information indicating an excessive storage of packets relative to a particular output line, and notifies said input buffer control circuit of said congestion control information;

wherein said input buffer control circuit suppresses reading, from said input buffer, of a packet to be distributed to said particular output line which is determined as a congested output line by said congestion control information;

wherein said switch comprises:
an intra-switch multiplexer circuit which multiplexes packets inputted from said plurality of input ports and outputs a multiplexed packet,
a shared buffer which temporarily stores said multiplexed packet from said intra-switch multiplexer circuit,
a shared buffer control circuit which writes each output packet in said shared buffer by adding each output packet to one of a plurality of variable length logical queues formed in correspondence with each output port, in accordance with header information of each output packet output from said intra-switch multiplexer circuit, and reads a packet by accessing each queue in a predetermined order, and
a demultiplexer circuit which distributes a packet read from said shared buffer to a corresponding one of said plurality of output ports,
wherein said congestion notifying circuit detects the number of packets in each of said queues in said shared buffer and generates said congestion control information.

12. The switching system according to claim 11, wherein said congestion notifying circuit comprises:
a counter which counts the number of packets in each queue in said shared buffer; and
a comparator which compares the number of packets counted by said counter with a predetermined threshold value,
wherein said congestion control information is generated in accordance with a comparison result from said comparator.

13. The switching system according to claim 12, wherein said congestion notifying circuit includes a storage which stores the comparison result from said comparator for each queue, and notifies the storage states of packets for said plurality of queues stored in said storage as said congestion control information.

14. The switching system according to claim 12, wherein said threshold value to be compared with the number of packets counted by said counter has a value larger than a value obtained by dividing the total number of packets that can be stored in said shared buffer by the number of output ports.

15. The switching system according to claim 11, wherein each input line and each output line are connected to said multiplexer/demultiplexer circuit via a line interface;
wherein each line interface includes an input side header converter which converts header information of an input packet into output header information containing output port discrimination information of said switch and an output side header converter which removes said output packet discrimination information from each output packet input from each output port of said switch; and wherein said shared buffer control circuit of said switch identifies a queue to which a packet is added, in accordance with said output port discrimination information contained in a header of said packet output from said intra-switch multiplexer circuit.

16. The switching system according to claim 11, wherein said switch includes a circuit which adds said congestion control information generated by said congestion notifying circuit to an output packet supplied from an output port connected to said multiplexer/demultiplexer circuit, and said input buffer control circuit suppresses reading a packet from said input buffer in accordance with said congestion control information derived from said output packet.

17. The switching system according to claim 11, wherein said multiplexer/demultiplexer circuit is provided for each pair of input and output ports of said switch;
wherein said congestion notifying circuit includes a plurality of congestion control information addition circuits connected to the output ports of said switch and a circuit which notifies each congestion information addition circuit of said congestion control information;
wherein each congestion control information addition circuit adds said congestion control information to each output packet distributed by said demultiplexer circuit; and
wherein said input buffer control circuit suppresses reading a packet from said input buffer in accordance with said congestion control information derived from said output packet.

18. A switching system comprising:
a switch having a plurality of input ports and a plurality of output ports for causing a packet input from one of said input ports to be distributed to one of said output ports determined as a destination by header information of the packet; and
a plurality of multiplexer/demultiplexer circuits each corresponding to a pair of input and output ports,
wherein each of said multiplexer/demultiplexer circuits comprises:
a multiplexer which multiplexes input packets arriving from a plurality of input lines,
an input buffer which temporarily stores multiplexed input packets,
an input buffer control circuit which writes a packet into said input buffer and reads said packet to a corresponding input port from said input buffer,
an output buffer which temporarily stores an output packet supplied from a corresponding output port,
a demultiplexer which distributes an output packet read from said output buffer to one of a plurality of output lines, and
an output buffer control circuit which writes an output packet into said output buffer, reads said output packet to said demultiplexer from said output buffer, and monitors a storage state of packets in said output buffer on an output line basis to generate congestion control information representing a congested output line in said output buffer,
wherein said congestion control information is notified to input buffer control circuits of said multiplexing/demultiplexing circuits by a control information distribution circuit, and each of said input buffer control circuits suppresses reading from an input buffer a packet to be distributed to said congested output line identified by said congestion control information.

19. A switching system comprising:

a switch having a plurality of input ports and a plurality of output ports for causing a packet input from one of said input ports to be distributed to one of said output ports determined as a destination by header information of the packet; and a plurality of multiplexer/demultiplexer circuits each corresponding to a pair of input and output ports, wherein each of said multiplexer/demultiplexer circuits comprises:
  a multiplexer which multiplexes input packets arriving from a plurality of input lines,
  an input buffer which temporarily stores multiplexed input packets,
  an input buffer control circuit which writes a packet into said input buffer and reads said packet to a corresponding input port from said input buffer,
  an output buffer which temporarily stores an output packet supplied from a corresponding output port,
  a demultiplexer which distributes an output packet read from said output buffer to one of a plurality of output lines, and an output buffer control circuit which writes an output packet into said output buffer, reads said output packet to said demultiplexer from said output buffer, and monitors a storage state of packets in said output buffer on an output line basis to generate congestion control information representing a congested output line in said output buffer, wherein said congestion control information is notified to input buffer control circuits of said multiplexing/demultiplexing circuits by a control information distribution circuit, and each of an input buffer control circuits suppresses reading from said input buffer a packet to be distributed to said congested output line identified by said congestion control information; and wherein each output buffer control circuit writes an output packet in said output buffer by adding said output packet to each variable length logical queue formed for each output line, in accordance with header information of said output packet, counts the number of stored packets in each queue, compares the number of counted packets with a predetermined threshold value, and generates said congestion control information.

20. A switching system comprising:

a switch having a plurality of input ports and a plurality of output ports for causing a packet input from one of said input ports to be distributed to one of said output ports determined as a destination by header information of the packet; and a plurality of multiplexer/demultiplexer circuits each corresponding to a pair of input and output ports, wherein each of said multiplexer/demultiplexer circuits comprises:
  a multiplexer which multiplexes input packets arriving from a plurality of input lines,
  an input buffer which temporarily stores multiplexed input packets,
  an input buffer control circuit which writes a packet into said input buffer and reads said packet to a corresponding input port from said input buffer,
  an output buffer which temporarily stores an output packet supplied from a corresponding output port,
  a demultiplexer which distributes an output packet read from said output buffer to one of a plurality of output lines, and an output buffer control circuit which writes an output packet into said output buffer, reads said output packet to said demultiplexer from said output buffer, and monitors a storage state of packets in said output buffer on an output line basis to generate congestion control information representing a congested output line in said output buffer, wherein said congestion control information is notified to input buffer control circuits of said multiplexing/demultiplexing circuits by a control information distribution circuit, and each of an input buffer control circuits suppresses reading from said input buffer a packet to be distributed to said congested output line identified by said congestion control information; and wherein said control information distribution circuit includes a congestion information distribution switch connected to said plurality of multiplexer/demultiplexer circuits for parallel distribution of said congestion control information collected from each output buffer control circuit to said plurality of input buffer control circuits.

21. The switching system comprising:

a switch having a plurality of input ports and a plurality of output ports for causing a packet input from one of said input ports to be distributed to one of said output ports determined as a destination by header information of the packet; and a plurality of multiplexer/demultiplexer circuits each corresponding to a pair of input and output ports, wherein each of said multiplexer/demultiplexer circuits comprises:
  a multiplexer which multiplexes input packets arriving from a plurality of input lines,
  an input buffer which temporarily stores multiplexed input packets, an input buffer control circuit which writes a packet into said input buffer and reads said packet to a corresponding input port from said input buffer, an output buffer which temporarily stores an output packet supplied from a corresponding output port, a demultiplexer which distributes an output packet read from said output buffer to one of a plurality of output lines, and an output buffer control circuit which writes an output packet into said output buffer, reads said output packet to said demultiplexer from said output buffer, and monitors a storage state of packets in said output buffer on an output line basis to generate congestion control information representing a congested output line in said output buffer, wherein said congestion control information is notified to input buffer control circuits of said multiplexing/demultiplexing circuits by a control information distribution circuit, and each of an input buffer control circuits suppresses reading from said input buffer a packet to be distributed to said congested output line identified by said congestion control information; and wherein each multiplexer/demultiplexer circuit includes a first circuit which adds said congestion control information to an input packet read from said input buffer; and wherein said control information distribution circuit includes a second circuit which derives said congestion control information from each input packet at said switch and a third circuit which notifies each input buffer control circuit of said congestion control information.

22. The switching system according to claim 21, wherein said control information distribution circuit includes a fourth circuit which adds said congestion control information derived from an input cell to each output cell output from said plurality of output ports; and wherein each input buffer control circuit derives said congestion control information from each output packet received at said output port, and controls reading a packet from said input buffer in accordance with said congestion control information.

23. The switching system comprising:

a switch having a plurality of input ports and a plurality of output ports for causing a packet input from one of said input ports to be distributed to one of said output ports determined as a destination by header information of the packet; and a plurality of multiplexer/demultiplexer circuits each corresponding to a pair of input and output ports, wherein each of said multiplexer/demultiplexer circuits comprises:

a multiplexer which multiplexes input packets arriving from a plurality of input lines, an input buffer which temporarily stores multiplexed input packets, an input buffer control circuit which writes a packet into said input buffer and reads said packet to a corresponding input port from said input buffer, an output buffer which temporarily stores an output packet supplied from a corresponding output port, a demultiplexer which distributes an output packet read from said output buffer to one of a plurality of output lines, and an output buffer control circuit which writes an output packet into said output buffer, reads said output packet to said demultiplexer from said output buffer, and monitors a storage state of packets in said output buffer on an output line basis to generate congestion control information representing a congested output line in said output buffer, wherein said congestion control information is notified to input buffer control circuits of said multiplexing/demultiplexing circuits by a control information distribution circuit, and each of an input buffer control circuits suppresses reading from said input buffer a packet to be distributed to said congested output line identified by said congestion control information; and wherein said switch comprises:

an intra-switch multiplexer circuit which multiplexes packets input from said plurality of input ports and outputs a multiplexed packet;

a shared buffer which temporarily stores said multiplexed packet from said intra-switch multiplexer circuit, a shared buffer control circuit which writes each output packet in said shared buffer by adding each output packet to a variable length logical queue formed in correspondence with each output port, in accordance with header information of each output packet output from said intra-switch multiplexer circuit, and reads a packet by accessing each queue in a predetermined order, and a demultiplexer circuit for causing a packet read from said shared buffer to be distributed to a corresponding one of said plurality of output ports.

24. A switching system connected to a plurality of input lines and a plurality of output lines, comprising:

a plurality of input buffers provided for said input lines;

a plurality of input buffer control circuits corresponding to said input buffers, each input buffer control circuit writes a packet arriving at one of said input lines in one of said input buffers and reads said packet from said one input buffer, said packet being distributed to one of said output lines as a destination;

a switch which temporarily stores packets read from the plurality of input buffers in a shared buffer, and distributes each packet to one of said output lines determined as a destination by header information of said packet;

a monitor circuit which monitors a storage state of packets in said shared buffer on a destination output line basis, and generates congestion control information representing a congested output line; and a congestion notifying circuit which notifies each of said input buffer control circuits of said congestion control information, wherein each of said input buffer control circuits decides whether to read said packet from said input buffer in accordance with said congestion control information; and wherein a packet transferred from each input line to each said output line is a fixed length packet of an asynchronous transfer mode.

25. The switching system comprising:

a switch having a plurality of input ports and a plurality of output ports for causing a packet input from one of said input ports to be distributed to one of said output ports determined as a destination by header information of the packet; and at least one multiplexer/demultiplexer circuit which multiplexer input packets arriving from a plurality of input lines, inputs multiplexed packets into one of said input ports of said switch, and distributes an output packet received from one of said output ports of said switch to one of a plurality of output lines, wherein said multiplexer/demultiplexer circuit includes an input buffer for temporarily storing said multiplexed input packets, and an input buffer control circuit which writes a packet into said input buffer and reads said packet to said input ports from said input buffer;

wherein said switch includes a congestion notifying circuit which detects a storage state of packets in said switch for each of said output lines, generates congestion control information indicating an excessive storage of packets relative to a particular output line, and notifies said input buffer control circuit of said congestion control information;

wherein said input buffer control circuit suppresses reading, from said input buffer, of a packet to be distributed to said particular output line which is determined as a congested output line by said congestion control information; and wherein a packet transferred from each input line to each output line is a fixed length packet (cell) of an asynchronous transfer mode (ATM).

26. A switching system comprising:

a switch having a plurality of input ports and a plurality of output ports for causing a packet input from one of said input ports to be distributed to one of said output ports determined as a destination by header information of the packet; and a plurality of multiplexer/demultiplexer circuits each corresponding to a pair of input and output ports, wherein each of said multiplexer/demultiplexer circuits comprises:
- a multiplexer which multiplexes input packets arriving from a plurality of input lines,
- an input buffer which temporarily stores multiplexed input packets,
- an input buffer control circuit which writes a packet into said input buffer and reads said packet to a corresponding input port from said input buffer,
- an output buffer which temporarily stores an output packet supplied from a corresponding output port,
- a demultiplexer which distributes an output packet read from said output buffer to one of a plurality of output lines, and
- an output buffer control circuit which writes an output packet into said output buffer, reads said output packet to said demultiplexer from said output buffer, and monitors a storage state of packets in said output buffer on an output line basis to generate congestion control information representing a congested output line in said output buffer, wherein said congestion control information is notified to input buffer control circuits of said multiplexing/demultiplexing circuits by a control information distribution circuit, and each of an input buffer control circuits suppresses reading from said input buffer a packet to be distributed to said congested output line identified by said congestion control information; and wherein a packet transferred from each input line to each output line is a fixed length packet of an asynchronous transfer mode.

27. The switching system according to claim 2, wherein said shared buffer control circuit comprises:
- a first circuit which forms a plurality of variable length logical output queues corresponding to each output line, on said shared buffer, adds an output packet from said multiplexer to one of said output queues identified by the header information of the output packet, and reads a packet by accessing said plurality of output queues in a predetermined order; and
- a congestion control generating circuit which generates said congestion control information indicating an output line with excessive packets by detecting a congestion state from the number of packets in each of said output queues, wherein each of said input buffer control circuits suppresses reading from said input buffer of a packet to be distributed to said output line based said congestion control information.

28. The switching system according to claim 27, wherein said congestion control information generating circuit comprises:
- a counter which counts the number of packets stored in each of said output queues;
- a comparator which compares a count value of said counter with a predetermined threshold value; and
- a circuit which generates said congestion control information for each of said output queues in accordance with a comparison result from said comparator.

29. The switching system according to claim 28, wherein said threshold value is set so that the total number of packets allowed to be stored in each of said plurality of output queues by said threshold value is in excess of the number of packets capable of being stored in said shared buffer.

30. The switching system according to claim 27, wherein said congestion control information generating circuit generates control information indicating a presence/absence of congestion in said plurality of output queues on said shared buffer at the same time.

31. The switching system according to claim 10, wherein said switch comprises:
- an intra-switch multiplexer circuit which multiplexes packets input from said plurality of input ports and outputs a multiplexed packet;
- a shared buffer which temporarily stores said multiplexed packet from said intra-switch multiplexer circuit;
- a shared buffer control circuit which writes each output packet in said shared buffer by adding each said output packet to a variable length logical queue formed in correspondence with each output port, in accordance with header information of each said output packet output from said intra-switch multiplexer circuit, and reads a packet by accessing each queue in a predetermined order; and
- a demultiplexer circuit which distributes a packet read from said shared buffer to a corresponding one of said plurality of output ports, wherein said congestion notifying circuit detects the number of packets in each queue in said shared buffer and generates said congestion control information.

32. The switching system according to claim 31, wherein said congestion notifying circuit comprises:
- a counter which counts the number of packets in each said queue in said shared buffer; and
- a comparator which compares the number of packets counted by said counter with a predetermined threshold value, wherein said congestion control information is generated in accordance with a comparison result from said comparator.

33. The switching system according to claim 32, wherein said congestion notifying circuit includes a storage which stores the comparison result from said comparator for each queue, and notifies storage states of packets for said plurality of queues stored in said storage as said congestion control information.

34. The switching system according to claim 13, wherein said threshold value to be compared with the number of packets counted by said counter has a value larger than a value obtained by dividing the total packet number capable of being stored in said shared buffer by the number of output ports.

35. The switching system according to claim 31, wherein each input line and each output line are connected to said multiplexer/demultiplexer circuit via a line interface;

wherein each line interface includes an input side header conversion circuit which converts header information of an input packet into output header information containing output port discrimination information of said switch and an output side header conversion circuit which removes said output packet discrimination information from each output packet input from each output port of said switch; and wherein said shared buffer control circuit of said switch identifies a queue to which a packet is added, in accordance with said output port discrimination information contained in a header of said packet outputted from said intra-switch multiplexer circuit.

36. The switching system according to claim 32, wherein said switch includes a circuit which adds said congestion control information generated by said congestion notifying circuit to an output packet supplied from an output port connected to said multiplexer/demultiplexer circuit, and said input buffer control circuit suppresses reading a packet from said input buffer in accordance with said congestion control information derived from said output packet.

37. The switching system according to claim 32, wherein said multiplexer/demultiplexer circuit is provided for each pair of input and output ports of said switch;

wherein said congestion notifying circuit includes a plurality of congestion control information addition circuits connected to the output ports of said switch and a circuit which notifies each said congestion information addition circuit of said congestion control information;

wherein each said congestion control information addition circuit adds said congestion control information to each output packet to be distributed by said demultiplexer circuit; and wherein said input buffer control circuit suppresses reading a packet from said input buffer in accordance with said congestion control information derived from said output packet.

38. The switching system according to claim 19, wherein said control information distribution circuit includes a congestion information distribution switch connected to said multiplexer/demultiplexer circuits for parallel distribution of said congestion control information collected from each output buffer control circuit to said input buffer control circuits.

39. The switching system according to claim 19, wherein each multiplexer/demultiplexer circuit includes a first circuit which adds said congestion control information to an input packet read from said input buffer; and said control information distribution circuit includes a second circuit which derives said congestion control information from each input packet at said switch and a third circuit which notifies each said input buffer control circuit of said congestion control information.

40. The switching system according to claim 39, wherein said control information distribution circuit includes a fourth circuit which adds said congestion control information derived from said input cell to each output cell output from said plurality of output ports; and wherein each input buffer control circuit derives said congestion control information from each output packet received at said output port, and controls reading a packet from said input buffer in accordance with said congestion control information.

41. The switching system according to claim 40, wherein said switch comprises:

an intra-switch multiplexer circuit which multiplexes packets input from said plurality of input ports and outputs a multiplexed packet;

a shared buffer control circuit which writes each output packet in said shared buffer by adding each said output packet to a variable length logical queue formed in correspondence with each output port, in accordance with header information of each said output packet output from said intra-switch multiplexer circuit, and reads a packet by accessing each queue in a predetermined order; and a demultiplexer circuit which distributes a packet read from said shared buffer to a corresponding one of said plurality of output ports.

42. A switching system connected between a plurality of input lines and a plurality of output lines comprising:

a plurality of input buffers corresponding to said input lines;

a control circuit provided for each of said input buffers for controlling a read/write of a packet arriving at a corresponding input line from/to a corresponding one of said input buffers;

a distributing circuit which temporarily stores a packet from each of said input buffers in a shared buffer and distributes said packet to one of said output lines in accordance with a destination output line determined by header information of the packet;

a congestion information generating circuit which monitors a storage state of packets in said shared buffer on an output line basis to generate congestion control information representing a congested output line; and a notifying circuit which notifies each of said control circuits of said congestion control information, wherein each of said control circuits suppresses reading from a corresponding input buffer a packet to be distributed to a congested output line in accordance to said congestion control information to control the packet storage state in said shared buffer.

* * * * *